US012232238B2

(12) United States Patent
Silva et al.

(10) Patent No.: US 12,232,238 B2
(45) Date of Patent: Feb. 18, 2025

(54) SOUND RANGING AND LUMINAIRE LOCALIZATION IN A LIGHTING SYSTEM

(71) Applicant: Tridonic Portugal, Unipessoal LDA, Villa Nova de Gaia (PT)

(72) Inventors: Carlos Silva, Paredes (PT); Kari Severinkangas, Vila Nova de Gaia (PT); Antonio Sousa, Valbom Gondomar (PT); Jorge Filipe, Oporto (PT); Joao Azevedo, Braga (PT)

(73) Assignee: Tridonic Portugal Unipessoal LDA, Villa Nova de Gaia (PT)

( * ) Notice: Subject to any disclaimer, the term of this patent is extended or adjusted under 35 U.S.C. 154(b) by 0 days.

(21) Appl. No.: 18/707,900

(22) PCT Filed: Dec. 14, 2022

(86) PCT No.: PCT/EP2022/085760
§ 371 (c)(1),
(2) Date: May 7, 2024

(87) PCT Pub. No.: WO2023/110967
PCT Pub. Date: Jun. 22, 2023

(65) Prior Publication Data

US 2024/0422886 A1 Dec. 19, 2024

(30) Foreign Application Priority Data

Dec. 16, 2021 (EP) .................................... 21215029

(51) Int. Cl.
*H05B 47/19* (2020.01)
*H05B 47/155* (2020.01)

(52) U.S. Cl.
CPC ........... *H05B 47/19* (2020.01); *H05B 47/155* (2020.01)

(58) Field of Classification Search
CPC .............................. H05B 47/19; H05B 47/155
See application file for complete search history.

(56) References Cited

U.S. PATENT DOCUMENTS

| | | | | |
|---|---|---|---|---|
| 2015/0276399 | A1 | 10/2015 | Breuer et al. | |
| 2020/0333429 | A1 | 10/2020 | Neser | |
| 2020/0383193 | A1 * | 12/2020 | Pauly, II | F21S 9/037 |

FOREIGN PATENT DOCUMENTS

| | | | | |
|---|---|---|---|---|
| DE | 10 2012 212080 A1 | 1/2014 | | |
| WO | WO-2013080082 A2 * | 6/2013 | | G01S 11/16 |

OTHER PUBLICATIONS

PCT/EP2022/085760, International Search Report dated Feb. 24, 2023, 4 pages.
PCT/EP2022/085760, Written Opinion dated Feb. 24, 2023, 9 pages.

* cited by examiner

*Primary Examiner* — Daniel D Chang
(74) *Attorney, Agent, or Firm* — Andrus Intellectual Property Law, LLP

(57) ABSTRACT

A method for determining locations of luminaires of a lighting system during a commissioning process uses sound beacons and measured travel time to determine distance. The method enables estimating the distance between the luminaires, and based thereon, the locations of the luminaires, entirely automatically by pinging the other devices, without requiring a commissioning engineer or technician initiating the distance measurement process at each luminaire individually, between luminaires and their location.

19 Claims, 10 Drawing Sheets

SOUND RANGING AND LUMINAIRE LOCALIZATION IN A LIGHTING SYSTEM

CROSS REFERENCE TO RELATED APPLICATIONS

The present application is the U.S. national stage application of international application PCT/EP2022/085760 filed Dec. 14, 2022, which international application was published on Jun. 22, 2023 as International Publication WO 2023/110967 A1. The international application claims priority to European Patent Application No. 21215029.6 filed Dec. 16, 2021.

BACKGROUND AND SUMMARY

The invention concerns measuring of distances between components of a lighting system and localizing the components. In particular, the invention proposes a method and a system for determining locations of luminaires for commissioning of the luminaires in the lighting system.

In the field of lighting, the term "commissioning" is used to denote to the process of activating a lighting control system after physical installation of the individual elements of the lighting system on a site. The lighting system comprises a plurality of luminaires amid other elements such as switchers, presence detectors, power supply, lighting control servers installed at fixed or even variable locations over an environment, for example an office, a building or plural buildings and its vicinity. Commissioning may involve steps of locating the individual components of the system, establishing communication between the components, activating the system, setting of system parameters, functional testing in order to ensure that the installed and commissioned lighting system satisfies all design targets and the specific requirements of a customer. The commissioning process is time-consuming in terms of hours of skilled workers, and, in case of manual commissioning, prone to mistakes, and involves considerable cost and often represents a major project risk with respect to time delays and cost.

Due to these considerations, there exists various approaches for improving the manual commissioning process. For example, it is proposed to use a wireless communication network of the lighting system for determining automatically a spatial layout of the wireless network. Individual nodes of the communication network may use received signal strength indication (RSSI) techniques or time-of-flight techniques to determine a spatial wireless network topography. Having determined the spatial arrangement of the communication nodes over the building, the determined wireless network topography onto the luminaire network topography, assuming that each luminaire corresponds to a communication node. However, using electromagnetic waves of the wireless network for determining distances between the individual nodes of the communication network results in significant uncertainties of the exact localization of each node. This results in corresponding inaccuracies in localizing and thus identifying the corresponding luminaires.

Moreover, known techniques using radio signals, for example, Bluetooth® signals, require antenna elements of a size, which is difficult to integrate with current light driver devices and luminaires.

Alternatively, one might consider using sound waves instead of radio waves for determining distances, and possibly directions between the individual luminaires of the lighting system, and thereby solving the localisation issue during commissioning. Due to the slower velocity of sound waves compared to the velocity of radio waves, using sound waves for ranging between luminaires appears to offer an increased accuracy over known radio wave based techniques.

DE 10 2012 212080 A1 proposes using ultrasonic signals for determining distances between individual luminaires arranged in a mesh network topology and suited for regular re-positioning of the luminaires. However, using ultrasonic waves for ranging purposes requires installing an additional ultrasonic transmitter and an ultrasonic receiver within each luminaire, and therefore involves additional hardware cost for the sole purpose of determining the distances between individual luminaires of the lighting system. Although DE 10 2012 212080 A1 provides each luminaire with a distance information to its neighbouring luminaires for controlling and adapting operation of the luminaire based on the determined distances, the problem of localizing the luminaires of the entire lighting system after installation is not addressed.

It is therefore desirable to improve the known approaches for commissioning of lighting systems, and in particular, for determining locations of luminaires within the lighting system in particular during commissioning of the lighting system.

A method for determining locations of luminaires of a lighting system according to a first aspect, a computer program to according to a second aspect, and a system according to the third aspect provide an advantageous solution to this problem.

The dependent claims define further advantages embodiments of the invention.

The first aspect concerns a method for determining locations of luminaires of a lighting system, for example during a commissioning process, wherein each of the luminaires is configured to communicate with at least one other of the luminaires. The method comprises: performing a background noise analysis for sound frequencies; selecting a first luminaire from the luminaires of the lighting system; transmitting, preferably by a commissioning device, a first signal to the selected first luminaire; transmitting, by the selected first luminaire in response to receiving the first signal, a wireless ranging activation signal to second luminaires of the lighting system, wherein the second luminaires are luminaires of the lighting system that are in direct wireless communication with the first luminaire; starting, by the second luminaires, a timer in response to receiving the first wireless signal; transmitting, by the first luminaire, a sound signal based on a result of the performed background noise analysis after a predetermined delay time interval since transmitting the wireless ranging activation signal elapsed; receiving, by each of the second luminaires, the sound signal; calculating, by each of the second luminaires, a time interval based on a first time of starting the timer and a second time of receiving the sound signal; generating, by each of the second luminaires, a second signal including the calculated time interval and transmitting the wireless result signal to a device defined in the wireless ranging activation signal; and determining locations of the luminaires of the lighting system based on the calculated time intervals received in the second wireless signals.

For the following explanations, it is assumed that the first and second signals are wireless signal and that the process is initiated by sending the first wireless signal by a commissioning device.

Due to using the a sound signal for distance measurement, only a simple loudspeaker and a microphone, or microphone assembly including an arrangement of plural microphones is sufficient for determining the distances between the luminaires of the lighting system. The additional hardware required for the inventive solution involves therefore only modest cost. Using the sound signal traveling with the velocity of sound enables to measure the time interval with high measurement accuracy, in particular when compared with a wireless ranging signal transmitted via radio waves. Calculating the distances between luminaires based on the calculated time intervals using the known sound velocity, and determining locations of the luminaires based thereon may be easily performed with acceptable computing power requirements centrally, for example at the commissioning device, or by a central device of the lighting system, an edge gateway device, or a cloud server.

Performing a background noise analysis, and transmitting the sound signal based on the results on the background noise analysis increases the signal-to-noise-ratio for the actual measurement process and improves the results of the measurement significantly, as the sound frequencies used for the actual measurement may be optimized for the specific sound environment of the lighting system and even a close environment of the individual luminaires of the lighting system. Thus, only the most silent sound frequencies, the sound frequencies with a lowest background noise level, corresponding to the most silent sound frequencies based on the performed background noise analysis may be used for transmitting the sound signal.

The method enables estimating the distance the distances between the luminaires, and based thereon, the locations of the luminaires, entirely automatically by pinging the other devices, without requiring a commissioning engineer or technician initiating the distance measurement process at each luminaire individually.

The method according to an embodiment comprises in the step of performing the background noise analysis, transmitting, by the commissioning device, a noise analysis request signal to the selected first luminaire of the lighting system. The noise analysis request signal includes information on the sound frequencies for performing the background noise analysis. The selected first luminaire transmits in response to receiving the noise analysis request signal, a noise analysis activation signal to the second luminaires. Each of the second luminaires determines a sound background noise level for each of the sound frequencies for which the background noise analysis is to be performed. Each of the second luminaires transmits a noise analysis result signal to the first luminaire or to another device that is defined in the noise analysis activation signal, The noise analysis result signal includes a quality indicator determined for each of the determined sound background noise levels.

Calculating the time interval by each of the second luminaires comprises in an embodiment of the method calculating the time interval based on the sound signal propagation delay, the predetermined delay time interval, and a wireless processing delay time interval. The wireless processing delay time interval corresponds to a time for processing of the wireless ranging activation signal in a wireless transceiver each of the first and the second luminaires. The method then further comprises a step of automatically determining the wireless processing delay time interval based on transmitting a wireless delay time measurement signal between the luminaires.

The noise analysis process is performed by the method using the luminaires on site, and therefore ensures that the most suitable sound frequencies may be selected for the actual measurement of the distances. No additional knowledge on the ambient sound environment of the lighting system is required. The background sound level for the actual environment, and the actual time of the distance measurement forms the basis for the calculating the delay time intervals by the luminaires.

According to an embodiment, the method comprises repeating the steps of transmitting the sound signal, receiving the sound signal, calculating the time interval using sound signals transmitted on a plurality of different sound frequencies, generating and transmitting the wireless result signal including the calculated time intervals for the sound signals on the plurality of different sound frequencies.

Thus, the method may determine the sound frequencies for an entire sound frequency range, in order to enable determining a sound frequency bitmap including the results of the noise analysis process for the specific arrangement of luminaires of the lighting system. This enables basing the actual delay time interval measurement process on the most suitable sound frequencies by adapting the sound frequencies used for the sound signals based on the determined sound frequency bitmap.

The device defined in the wireless ranging activation signal may be the first luminaire. Alternatively, device defined in the wireless ranging activation signal is the commissioning device, wherein the wireless ranging activation signal includes a network address of the commissioning device.

This configuration enables to adapt the method to the specific layout of the lighting system, as alternatively the commissioning device, or the respective luminaire acting as first luminaire may collect the noise analysis result messages depending on the available communication links of the wireless communication network of the specific lighting system.

The method may comprise repeating the step of selecting the first luminaire with selecting a different luminaire of the lighting system as a new first luminaire. Then the method repeats the steps of transmitting the sound signal, receiving the sound signal, calculating the time interval, generating and transmitting the second wireless signal including the calculated time interval for the selected new first luminaire.

This enables calculating the delay time intervals, and based thereon the distances between luminaires of the lighting system in a fully automated manner, even for the lighting system with the communication network linking the luminaires in a mesh network topology or using an ad-hoc communication network.

According to a further embodiment, the method comprises repeating the steps of selecting the first luminaire with selecting a different luminaire of the lighting system as the new first luminaire. The method subsequently repeats the steps of transmitting the sound signal, receiving the sound signal, calculating the time interval, generating and transmitting the second wireless signal including the calculated time interval for the selected new first luminaire, until every luminaire of the lighting system had been selected as the first luminaire at least once.

This ensures that calculating the delay time intervals, and based thereon the distances between luminaires over the entire lighting system in a fully automated manner.

The method may comprise, for the luminaires each including a microphone array including at least two microphones, determining, for each of the second luminaires, a relative direction of the first luminaire with respect to the second luminaire.

A microphone array is still a cost effective component yet evaluating the delay time intervals for the individual microphones of the sound enables to calculate a direction of the received sound signal at the luminaire with based on differences in delay time intervals of individual microphones of the microphone array of the luminaire. Therefore, determining the actual locations of the luminaires may be more reliably performed over the entire lighting system, as not only distances between the individual luminaires, but also directions information on directions of the luminaires to each other is actually measured, and not only determined via triangulation using different luminaires, for example.

In case each luminaire includes plural microphones, the method may, in the step of calculating comprise each of the second luminaires calculating plural time intervals based on the first time of starting the timer and the second time of receiving the sound signal for each of the plural microphones. In the step of generating, the wireless result signal includes the plural time intervals calculated for each of the plural microphones. In the step of transmitting, the second wireless signal is transmitted to the commissioning device, and in the step of determining, by the commissioning device, locations of the luminaires of the lighting system determining the locations based on the calculated time intervals for each of the plural microphones.

In an embodiment of method, the sound frequencies are in a range of audio frequencies, in particular in the range between 1 kHz and 8 kHz, and most particular in the range between 2 kHz to 7 kHz.

The sound frequencies in the audible sound frequency range enable using simple and cheap microphones and loudspeakers at each of the luminaires for implementing the method. The additional cost for mass produced luminaires are accordingly small. The method mainly requires amendments and additions in software and/or firmware of components of the lighting system and is therefore highly cost efficient.

The method may include, in the step of performing the background noise analysis, determining the background noise level for sound frequencies of a predetermined range of the sound frequencies.

Thus, at a factory, the predetermined range may be set in advance, whereas the actual use of the sound frequencies of the predetermined range is decided locally based on the local/and/current results of the background noise analysis process.

The device defined in the wireless ranging activation signal can be an edge gateway device of the lighting system, or a cloud server.

Thus, components of the existing lighting system with a data processing capability may be used to enhance the lighting system by implementing the method. A highly cost-effective implementation of the method is available.

The method according to an embodiment further comprises a step of detecting presence of at least one moving object in the environment of the lighting system based on a reflected sound signal.

Thus, the method provides further data for indoor applications by using the microphone and the loudspeaker of the luminaire for further applications based on presence detection and movement detection in an integrated manner. Thus, additional applications without resulting in significant additional cost, as luminaire already includes the microphone and the loudspeaker for processing audible sound signals, and without having to use additional hardware such as a presence detector or a movement detector, may be easily implemented.

The method may further comprise calculating a location of at least one mobile object by the at least one mobile object, based on a received wireless positioning signal, and further based on a received sound signal transmitted by the at least one of the luminaires. The received wireless positioning signal includes location information of at least one of the luminaires. Calculating a location of at least one mobile object, by the at least one mobile object, is further based on a received wireless ranging activation signal, wherein the received wireless ranging activation signal includes location information of the at least one of the luminaires, and further based on a received sound signal transmitted by the at least one of the luminaires.

The method enables, based on the actually determined of distances, in particular calculated delay time intervals based on measurements, to provide devices such as mobile phones, tablet computers, notebooks, etc., within the environment covered by the lighting system, with position information without having to integrate a further separate indoor navigation system. Thus, the method provides further data for any location-based indoor application in an integrated manner, without significant additional cost, as the mentioned devices most probably all include a microphone and a loudspeaker for processing audible sound signals.

According to an embodiment, the method further comprises using a microphone of at least one of the luminaires as an input device and a speaker of the at least one of the luminaires as an output device of a voice user interface.

This embodiment is highly cost-effective, as the additional hardware for the transmitting and receiving the sound signal is not only used for determining the distances between the luminaires, in particular during commissioning of the luminaires, but also for implementing further advantageous functionalities of the lighting system, in particular functionalities during actual operation of the lighting system after commissioning.

The method may further comprise generating a map of a spatial arrangement of the luminaires of the lighting system based on the determined locations of the luminaires and an acquired reference location of at least one of the luminaires.

An automated map generating based on the actually determined of distances, in particular calculated delay time intervals based on measurements, enables to provide the user with confirmed data on the spatial arrangement without having to perform a map generation process separately from data determined for individual luminaire. Thus, the method provides further data for any location-based indoor application in an integrated manner, without significant additional cost.

The problem is solved by a computer program with program-code means for executing the method according to the first embodiment, when a computer or digital signal processor executes the program.

The computer program may include a plurality of program modules and programs, which perform the method according to the first aspect by interacting with each other. The plurality of program modules and programs may perform the method by performing a distributed processing on a plurality of processing circuits (microprocessors, signal processors) arranged in at least one of luminaires, gateway devices, central servers, cloud servers, commissioning devices, or other devices of the lighting system.

The second aspect concerns a system for determining locations of luminaires of a lighting system during a commissioning process using a commissioning device. Each of the luminaires is configured to communicate with at least one other of the luminaires. The system comprises the commissioning device configured to initiate performing a background noise analysis for sound frequencies, to select a first luminaire from the luminaires of the lighting system, and to transmit a first wireless signal to the selected first luminaire. The selected first luminaire is configured to transmit in response to receiving the first wireless signal, a wireless ranging activation signal to second luminaires of the lighting system. The second luminaires are luminaires of the lighting system that are in direct wireless communication with the first luminaire. The selected first luminaire is further configured to transmit a sound signal based on a result of the performed background noise analysis after a predetermined delay time interval since transmitting the wireless ranging activation signal elapsed. Each of the second luminaires is configured to start a timer in response to receiving the first wireless signal, to receive the sound signal, to calculate a time interval based on a first time of starting the timer and a second time of receiving the sound signal. Each of the second luminaires is further configured to generate a second wireless signal including the calculated time interval and to transmit the wireless result signal to a device defined in the received wireless ranging activation signal. The device is configured to determine locations of the luminaires of the lighting system based on the calculated time intervals received in the second wireless signals, and to generate a map of the of the luminaires of the lighting system based on the determined locations of the luminaires and an acquired reference location of at least one of the luminaires.

The fourth aspect concerns a luminaire for a lighting system, wherein the luminaire is configured to communicate with at least one other luminaire of the lighting system. The luminaire comprises a wireless transceiver configured to transmit and to receive wireless signals with the at least one other luminaire and a commissioning device, a sound emitter configured to output sound, at least one microphone configured to receive sound, and a control circuit. In a first mode, the wireless transceiver is configured receive from the commissioning device, a first wireless signal. The wireless transceiver is configured to transmit, in response to receiving the first wireless signal, a wireless ranging activation signal to the at least one other luminaire of the lighting system, that is in direct wireless communication with the luminaire. The sound emitter is configured to transmit a sound signal after a predetermined delay time interval since transmitting the wireless ranging activation signal elapsed. The wireless transceiver is configured receive from the at least one other luminaire, a second wireless signal including a calculated time interval and to transmit the received second wireless signal to the commissioning device. In a second mode, the control circuit is configured to start a timer in response to receiving the wireless ranging activation signal, and the at least one microphone is configured to receive the sound signal from the at least one other luminaire of the lighting system. The control circuit is further configured to calculate a time interval based on a first time of starting the timer and a second time of receiving the sound signal. The control circuit is further configured to generate a second wireless signal including the calculated time interval and to control the wireless transceiver to transmit the second wireless signal to a device defined in the received wireless ranging activation signal.

BRIEF DESCRIPTION OF THE DRAWINGS

The description of embodiments refers to the attached figures, in which.

DETAILED DESCRIPTION OF THE EXEMPLARY EMBODIMENTS

In the figures, same reference signs denote same or corresponding elements. The description of embodiments dispenses with discussing elements with same reference signs in different figures where considered possible without affecting comprehensibility.

Figure 1:
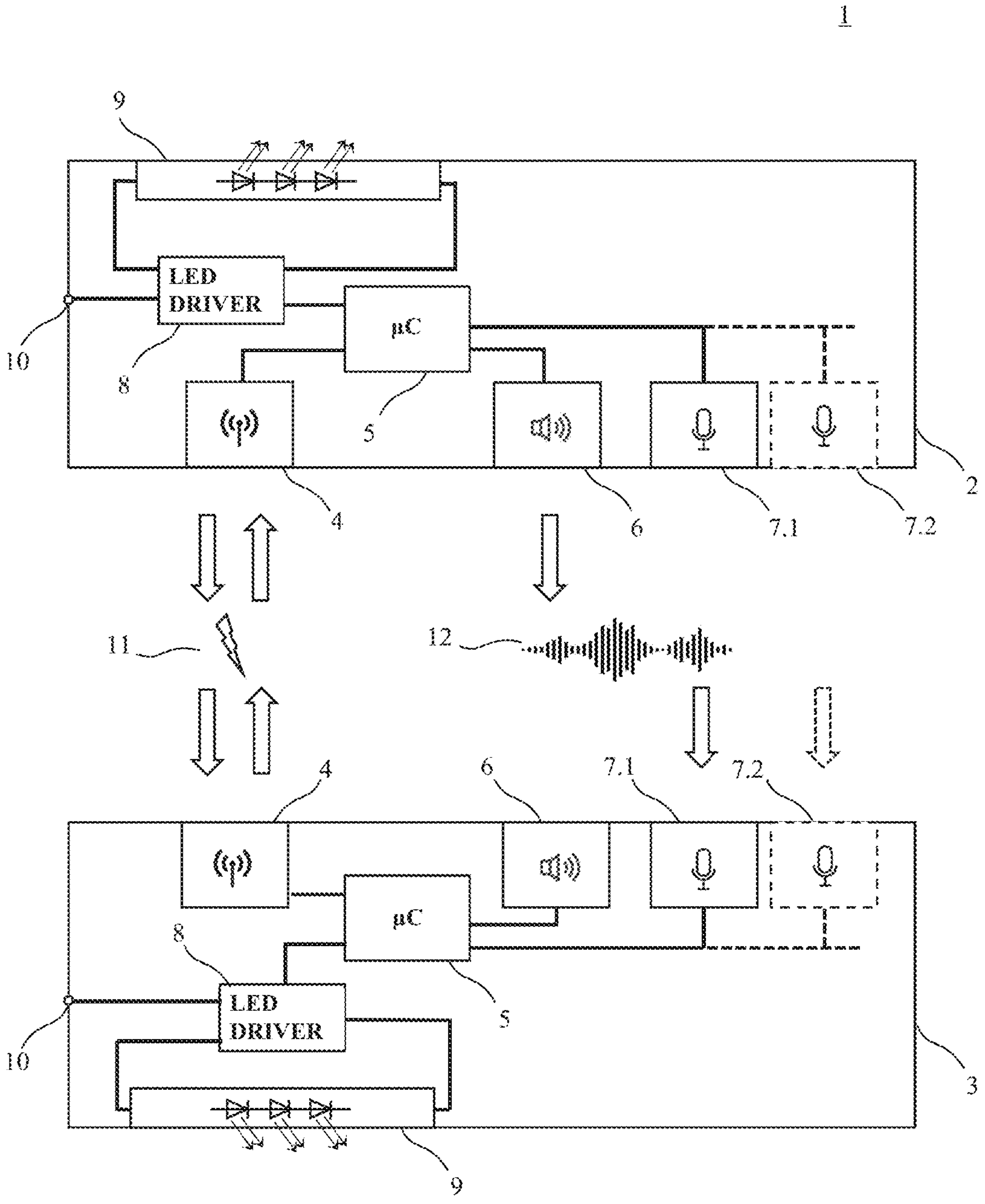
FIG. 1 presents a simplified block diagram of two luminaires of a lighting system in an embodiment.

FIG. 1 presents a simplified block diagram of two luminaires 2, 3 of a lighting system 1 in an embodiment.

The luminaire depicted in the upper portion of FIG. 1 is selected to act as a controlling luminaire (first luminaire 2) for performing the method according to the invention. The lower portion of FIG. 1 shows a luminaire acting as a listening luminaire (second luminaire 3) when performing the method according to the invention. The close inspection of their individual structural elements of the first luminaire 2 and the second limit luminaire 3 shows that their internal structure is identical. Thus, the luminaires 2, 3 may exchange their roles when performing the method, the upper luminaire in FIG. 1 performing the role of the as a listening luminaire, and the lower luminaire in FIG. 1 performing the role of the controlling luminaire.

The first luminaire 2 comprises a wireless transceiver 4 for transmitting and receiving wireless signals 11 with other wireless transceivers of the lighting system 1. In particular, the wireless transceiver for of the first luminaire to enables the luminaire 2 to communicate wirelessly with the second luminaire 3.

The wireless transceiver 4 may combine receiver and transmitter according to any radio communication standard. This includes in particular radio communication standards included in the IEEE 802 set of local area network technical standards such as 802.11 (WLAN, Mesh, Wi-Fi®), 802.15 (Wireless PAN, e.g. 802.15.1 Bluetooth®, or 802.15.4 Low-Rate Wireless PAN, e.g. ZigBee®).

A control circuit 5 of the first luminaire 2 generates wireless signals for wireless transmission by the wireless transceiver 4. The control circuit 5 also generates sound signals for transmission via a sound output device, for example an acoustic transducer and, in particular, a loudspeaker 6 of the second luminaire 2.

Preferably, the sound output device outputs sound signals as acoustic waves in a sound frequency range between about 20 Hz and 20 kHz (audio frequency range). In particular, the sound output device outputs sound signals in a sound frequency range between 2 kHz and 7 kHz.

The first luminaire 2 may include plural sound output devices. Each of the plural output devices may be configured to output sound signals in the specific sound frequency range. For example, a first output device may output a sound signal in an acoustic frequency range, and a second output device may output a sound signal in an ultrasound acoustic frequency range. Sound signals with sound frequencies in the ultrasound acoustic frequency range are not audible to humans.

The plural sound output devices may be configured to output sound signals in different spatial sectors around the first luminaire 2.

The control circuit 5 may select a sound frequency channel for outputting the sound signal from a predetermined sound frequency table based on a selection signal received externally.

Additionally or alternatively, the control circuit 5 may perform processing in order to select a suitable sound frequency channel from the predetermined sound frequency table.

The control circuit 5 may include memory not depicted in FIG. 1, which, for example, stores the predetermined sound frequency table. Alternatively or additionally, the memory may store position information defining a location at which the first luminaire 2 is positioned.

The control circuit 5 may extract the position information defining the location of the first luminaire 2 from a wireless signal received by the wireless transceiver 4 install the extracted position information in the memory.

The control circuit 5 may access the memory and extract the position information defining the location of the first luminaire 2 from the memory, generate a wireless signal including the extracted position information defining the location of the first luminaire 2, and control the wireless transceiver 4 to transmit the generated wireless signal.

The control circuit 5 may control the wireless transceiver 4 to transmit the generated wireless signal including the position information defining the location of the first luminaire 2, and to control the loudspeaker 6 to output a sound signal 12 a predetermined time interval after transmitting the generated wireless signal including the position information.

In particular, the control circuit 5 may control the wireless transceiver 40 to transmit the generated wireless signal including the position information and the loudspeakers extrapolate a sound signal 12 the predetermined time interval thereafter in response to receiving a request signal from another device. The other device may be a mobile phone, the tablet computer or notebook computer, and in particular may be another device within wireless range of the transceiver 4.

The first luminaire 2 comprises at least one microphone 7.1 configured to receive sound signals 12 and to provide the received sound signals to the control circuit 5.

Alternatively, the first luminaire 2 may comprise a microphone array 7 comprising the microphone 7.1 and at least one further microphone 7.2. the first luminaire 2 comprising a microphone array 7 including plural microphones 7.1, 7.2 may enable the control circuit 5, or any other suitably configured evaluating circuit provided with the received sound signals 12 from the individual microphone 7.1, 7.2, to execute a processing for determining an incident direction of the sound signal 12 with respect to the microphone array 7 and the luminaire 2.

The luminaire 2 comprises an LED driver circuit 8, which provides an LED current to an LED module 9. The LED module 9 may include a plurality of LEDs for emitting according to the LED current provided by the LED driver circuit 8 and on the control of the control circuit 5.

The LED driver circuit 8 may include a main supply interface 10 to the main supply network of a building.

The LED driver circuit 8 may also provide a low-power low voltage power supply for supplying the transceiver 4, the control circuit 5, the loudspeaker 6, and the microphone 7.1, 7.2.

In addition to the luminaires 2, 3 of the lighting system 1 shown in FIG. 1, the lighting system 1 may comprise further structural components, for example on/off-switches, dimming switches, presence detecting sensors, movement detecting sensors, central control servers, emergency power supply equipment for bridging a mains power supply failure.

Figure 2:
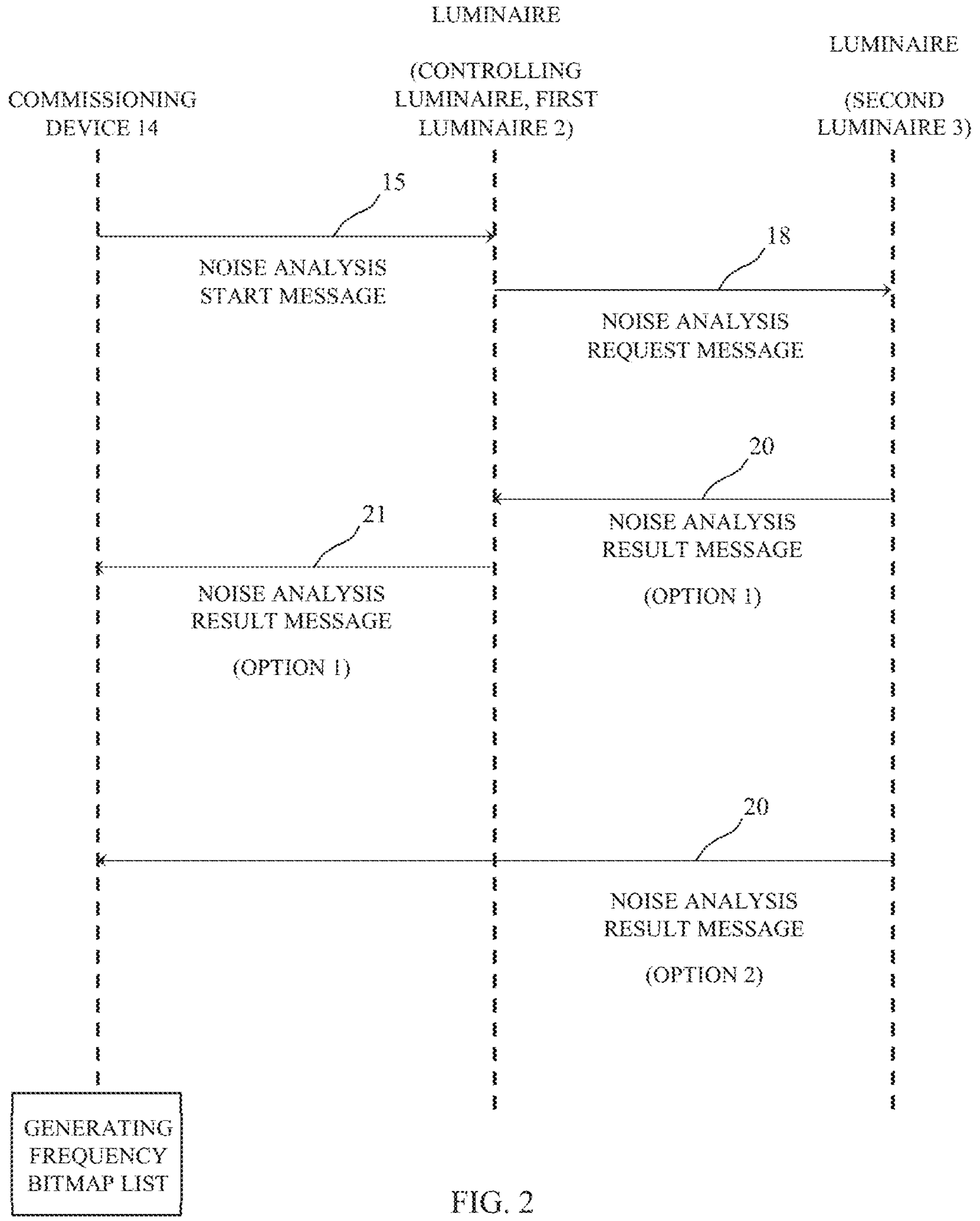
FIG. 2 depicts a simplified sequence diagram of an analysis process of acoustic background noise according to an embodiment.

FIG. 2 depicts a simplified sequence diagram of an analysis process for analysing acoustic background noise according to an embodiment.

The simplified sequence diagram provides details of the background noise analysis for sound frequencies in the lighting system 1. The discussion of FIG. 2 centres on the protocol sequence and the protocol messages exchanged between the participants in the process of background noise analysis.

The discussion of FIGS. 4 to 7 will provide more details on the background noise analysis in the based on the sequence of FIG. 2 regarding the lighting system 1 and its elements.

A commissioning device 14 starts the noise analysis process in the sequence according to FIG. 2 by transmitting a noise analysis start message to a selected luminaire 2 of the plurality of luminaires 2, 3 of the lighting system 1. The selected luminaire 2 acts as controlling luminaire 2 (first luminaire 2).

The commissioning device 14 transmits the noise analysis start message to a selected luminaire 2 in the form of a first wireless signal.

The noise analysis start message may include a parameter that defines the sound frequencies, for which to perform the background analysis. In particular, the a noise analysis start message may include as a parameter a list of sound frequencies or sound frequency channels of a predetermined sound frequency channel bandwidth for performing the a noise analysis.

The parameter specifying the sound frequencies, for which to perform the background analysis may have the form of a frequency bitmap.

The noise analysis start message may include a further parameter that defines an addressee for the results of the background noise analysis. The results of the background noise analysis may have the form of a beacon reception result message.

In a particular example, a parameter defines the commissioning device 14 as intended recipient of the results of the background noise analysis, for example by providing a network address of the commissioning device 14.

In an alternate embodiment, the noise analysis start message may include a parameter that defines that the beacon reception result message is to be transmitted to a device emitting the sound beacon scan request message to the luminaires 3, in present example the first luminaire 2.

The noise analysis start message may further define details of the beacon reception result message, for example, that the analysis results are to be returned in form of a frequency bitmap list based on classified background noise analysis result classified into quality classes 1 to 5. The quality classes 1 to 5 each define a range of the background noise level.

The frequency bitmap list may include predefined sound frequencies channels with a channel bandwidth of 1 kHz in a sound frequency range starting from 1 kHz as a lowest sound frequency included in the frequency bitmap list. A sound frequency of 5 kHz may be represented by bit sequence of "00001000".

The first luminaire 2 transmits, in response to receiving the first wireless signal from the commissioning device 14, a noise analysis request signal to second luminaires 3 of the lighting system 1.

The second luminaires 3 are luminaires of the lighting system 1 that are in direct wireless communication range of the first luminaire 2. For the lighting system 1 having the structure of a mesh network, the second luminaires 3 are luminaires 2, 3 that are one hop away from the first luminaire 2. Thus, the first luminaire 2 and the second luminaires 3 are in direct wireless communication with each other, without routing wireless signals via other luminaires 3 or signal-repeating devices between emitter of the wireless signal to recipient of the wireless signal.

Figure 3:
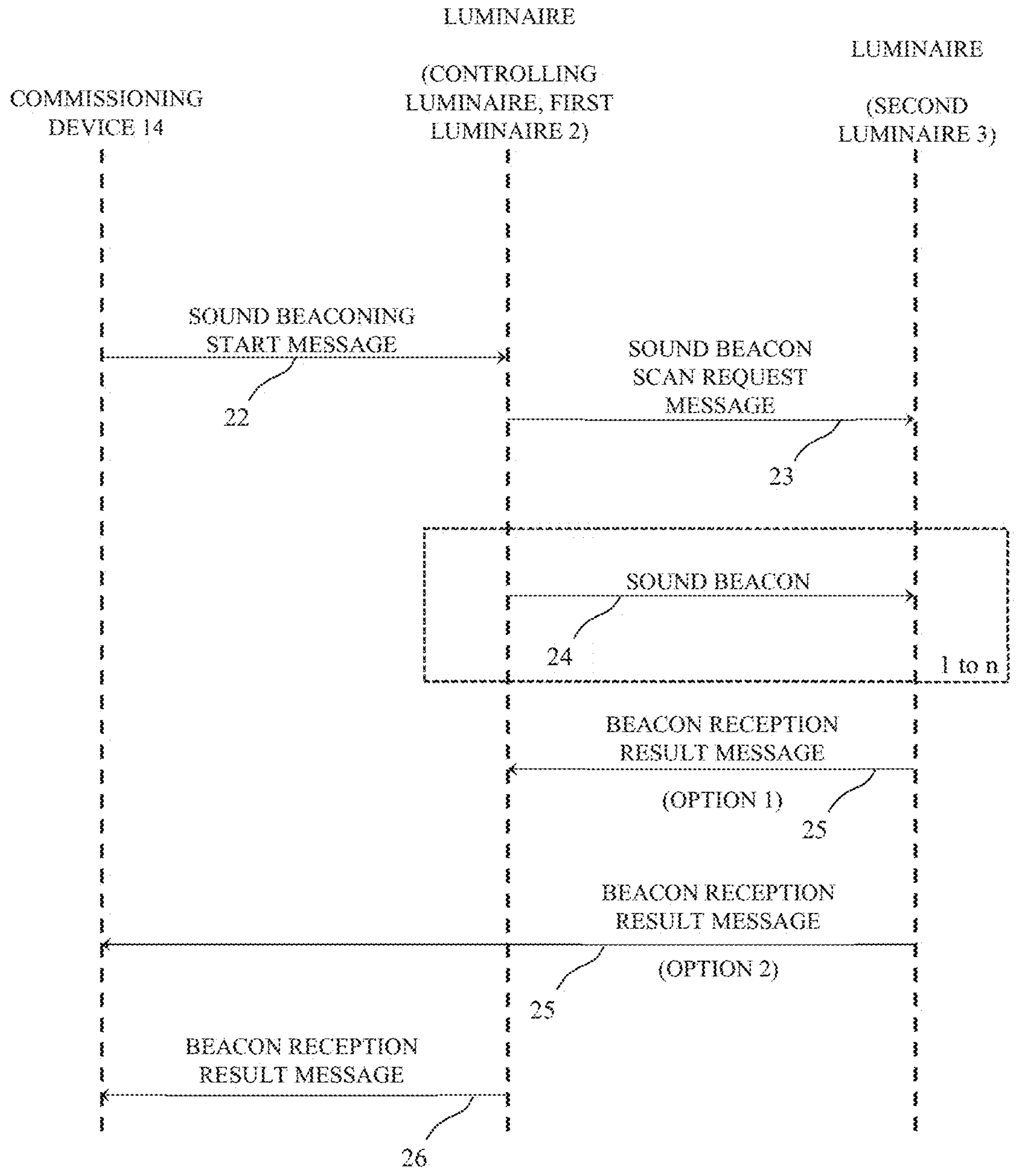
FIG. 3 depicts a simplified sequence diagram of a ranging process for determining a distance between a first luminaire and a second luminaire according to an embodiment.

FIG. 3 depicts a simplified sequence diagram of a ranging process for determining a distance between a first luminaire 2 and a second luminaire 3 according to an embodiment.

The commissioning device 14 transmits the sound beaconing start message 22 to the selected luminaire 2. The selected luminaire 2 acts as the controlling luminaire 2.

The sound beaconing start message 22 may include as parameter, the network address of the commissioning device 14 as intended recipient of the noise analysis results, in particular a beacon reception result message 26. Alternatively, the sound beaconing start message 22 may define that the beacon reception result message 26 is to be returned to the device emitting the sound beacon message, in particular the first luminaire 2 acting as controlling luminaire.

The sound beaconing start message 22 may include as parameter a pulse frequency list in form of a frequency bitmap for defining the beacon signals to be used by the first luminaire during the background noise analysis. The sound beaconing start message may include as further parameter a number of test scans to be made during the background noise analysis. The number of test scans may include, for example, an integer number between one and n defining the number of repetitions of the test scans with same test parameters.

In response to receiving the sound beaconing start message 22, the first luminaire 2 transmits a sound beacon scan request message to the second luminaires 3. The sound beacon scan request message is transmitted via the wireless transceivers 4 of the first luminaire 2 and the second luminaires 3 respectively.

The sound beacon scan request message may include as parameter a pulse frequency list in form of a frequency bitmap for defining the beacon signals, which will be transmitted by the first luminaire during the background noise analysis. The sound beaconing start message may include as further parameter a number of test scans performed during the background noise analysis. The number of test scans may include, for example, an integer number between one and n defining the number of repetitions of the test scans with same test parameters.

The first luminaire 2 subsequently, after a predetermined time interval elapsed, transmits a sound beacon message to the second luminaires 3. The sound beacon scan request message is transmitted via the wireless transceiver 4 of the first luminaire 2 to the respective wireless transceivers 4 of the second luminaires 3.

The sound beacon message may include an actual number of the current test scan. The overall number of test scans, and thereby the number of repetitions of the sound beacon message 24 is specified in the sound beacon scan request message from the first luminaire 2 to the second luminaires 3 before.

The second luminaires 3 generate and transmit via their wireless transceiver 4 a beacon reception result message. The beacon reception result message is transmitted to the recipient defined in the sound beacon scan activation message. The defined recipient may be the first luminaire 2 (option 1) or another entity on the wireless network, in particular the commissioning device 14 (option 2).

The beacon reception result message includes as parameter a calculated time interval corresponding to the propagation delay time of the sound signal from the first luminaire 2 to the respective second luminaire 3. In particular, the beacon reception result message may include a median of the calculated test results. The beacon reception result message may include a value corresponding to the calculated test results comprising the sound propagation delay (sound travel time) with a subtracted sound delay.

The beacon reception result message may include as a parameter the number of test results generated by the second luminaire 3. In particular, the beacon reception result message may include as parameter the number of received sound beacons. The number of received sound beacons corresponds to a number of test results. The number of the test results is an integer between 1 and m, wherein m is equal or below the number of test scans indicated as parameter in the sound scan request message 23.

The beacon reception result message includes as a parameter the address of the first luminaire 2. The first luminaire is the luminaire 2, which acted as a controlling luminaire 2 (steering device) for the test, i. e. the luminaire 2, which transmitted the sound beacon scan request message 23 and the sound beacons 24 for the current test.

The beacon reception result message includes as a parameter the addressee of the beacon reception result message as specified in the sound beacon scan activation message. The defined recipient may be the first luminaire 2 (option 1) or another entity on the wireless network, in particular the commissioning device 14 (option 2).

Concerning option 2, the first luminaire 2 receives the beacon reception result message 25 from the second luminaire 3. In particular, the first luminaire 2 receives the beacon reception result messages 25 from the plural second luminaires 3 within one-hop range of the first luminaire 2.

The first luminaire 2 generates a further beacon reception result message 26.

This further beacon reception result message 26 may be based on the received beacon reception result message(s) 25 from the second luminaire(s) 3.

The further beacon reception result message 26 includes as parameter the calculated time interval corresponding to the propagation delay time of the sound signal from the first luminaire 2 to the respective second luminaire 3, which were received in the beacon reception result message from the second luminaire 3. In particular, the further beacon reception result message 26 may include a median of the calculated test results, taking into account the sound travel time inside the first luminaire 2 acting controlling luminaire 2 (steering device). The sound travel time corresponds to a value corresponding to a time delay generated by a delayed speaker activation in each first luminaire 2. The commissioning device 14 may use this sound travel time received in the further beacon reception result message 26 to subtract it from the test results received from the second luminaires 3.

The commissioning device 14 may receive the test results received from the second luminaires 3, either directly from the second luminaire(s) 3 (option 2) or via the first luminaire 2 (option 1). For example, the commissioning device 14 may receive the test results received from the second luminaires 3 from the first luminaire 2 in the further beacon reception result message 26, or in a further beacon reception result message separate from the further beacon reception result message 26.

The further beacon reception result message 26 may include as a parameter the number of results generated by the first luminaire 2. In particular, the further beacon reception result message 26 may include as a parameter the number of results. The number of received sound beacons corresponds to a number of test results received by the first luminaire 2. The number of the test results is an integer, wherein number of test results is equal or below the number of test scans indicated as parameter in the sound scan request message 23 and the sound beacons 24 transmitted by the first luminaire 2.

The further beacon reception result message 26 includes as a parameter the address of the first luminaire 2 generating and transmitting the further beacon reception result message 26.

The further beacon reception result message 26 include as a parameter the number of tests.

The first luminaire 2 transmits the further beacon reception result message 26 based on the received beacon reception result message(s) 25 from the second luminaire(s) 3 to the commissioning device 14.

Figure 4:
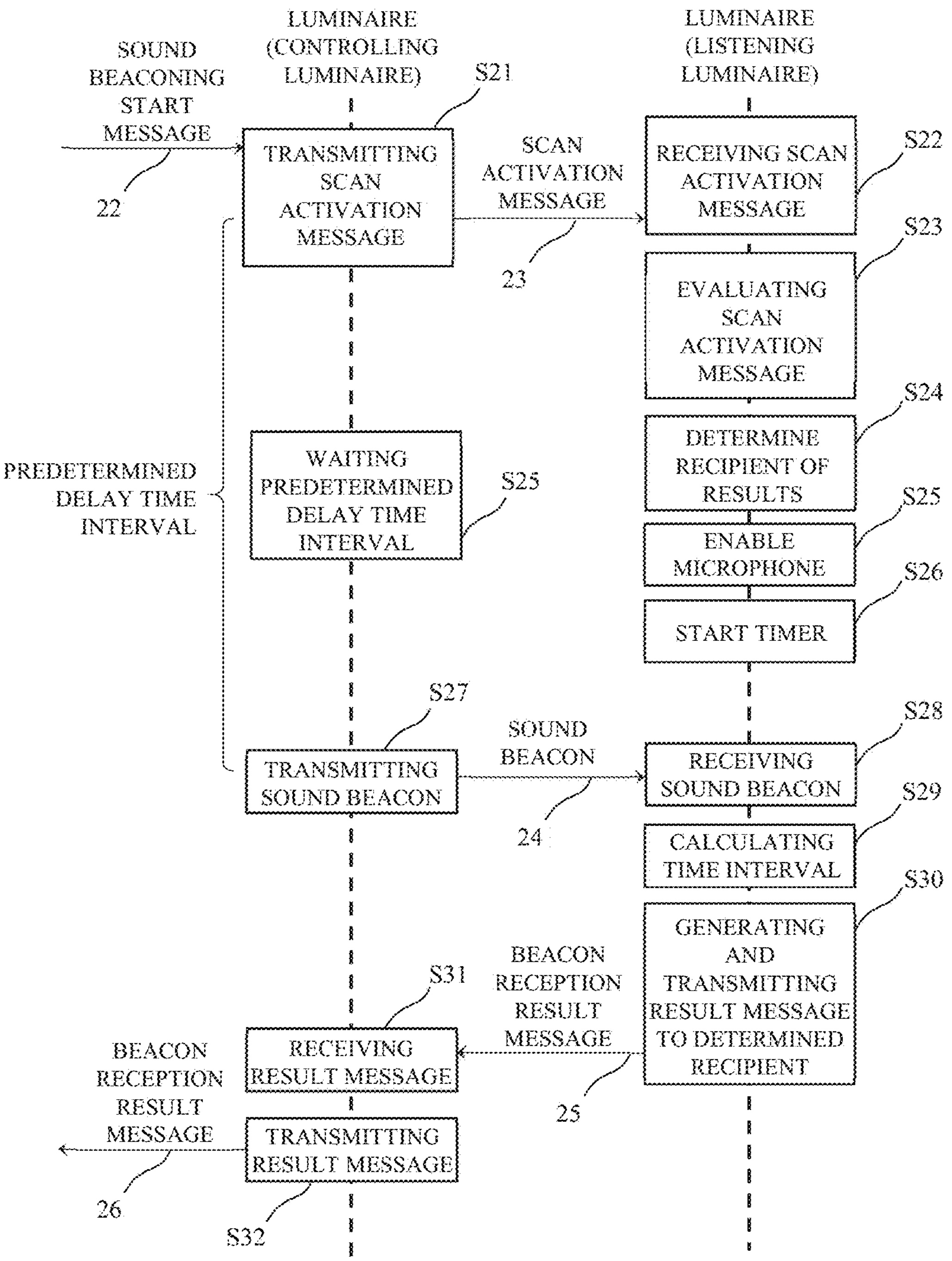
FIG. 4 depicts a further simplified sequence diagram of a ranging process for determining a distance between a first luminaire and a second luminaire according to an embodiment.

FIG. 4 depicts a further simplified sequence diagram of a ranging process for determining a distance between a first luminaire and a second luminaire according to an embodiment.

The discussion of FIG. 4 centres on the actual distance measurement based on the received sound signal 12 from the first luminaire 2 and received by one particular second luminaire 3 of the second luminaires 3 respectively listening to the first luminaire 2.

The sequence diagram shown in FIG. 4 display an embodiment, in which the scan activation message transmitted by the first luminaire 2 as the controlling luminaire of the current ranging process includes the parameter identifying the first luminaire as the recipient of the beacon reception result message, denoted as option 1 in FIG. 3.

The first luminaire in FIG. 4 is the selected luminaire of the luminaires 2, 3 of the lighting system for the current ranging process.

In FIG. 4, the processing starts with the first luminaire 2 receiving the sound beaconing start message from the commissioning device 14.

The first luminaire 2 generates the scan activation message in response to receiving the first wireless signal from the commissioning device 14. The first luminaire 2 transmits the generated scan activation message in a wireless signal via the wireless transceiver 4 of the first luminaire 2 to the wireless transceiver 4 of the second luminaire 3.

FIG. 4 shows for sake of comprehensibility a single second luminaire 3. The first luminaire 2 transmits the scan activation message to the wireless transceivers 4 of all second luminaires 3, which are the luminaires 2, 3, which are within a one-hop range of the first luminaire 2.

The second luminaire 3 receives the wireless signal including the scan activation message. The second luminaire evaluates the received scan activation message. In particular, the second luminaire 3 evaluates the actual parameter values of the scan activation message. Based on the evaluated parameter values of the scan activation message, the second luminaire 3 identifies the first luminaire 2, which is the controlling luminaire of the current ranging process.

The second luminaire 3 extracts the intended recipient for the beacon reception result message from the corresponding parameter of the received beacon reception result message. In the particular example depicted in FIG. 4, the intended recipient is the second luminaire 2.

Furthermore, the second luminaire 3 may extract from the beacon reception result message the sound frequency of the sound signal used for the actual sound signal.

Furthermore, the second luminaire 3 may extract from the beacon reception result message the number of test scans corresponding to the repetitions of transmissions of the sound signal in the actual test scan.

The second luminaire 3 enables the microphone 7.1, 7.2 to listen, in particular to listen on the sound frequency defined in the scan activation message.

Furthermore, the second luminaire 3 starts a timer in response to receiving the scan activation message in step S28.

The first luminaire 2 waits until a predetermined delay time interval elapses after transmitting the scan activation message via the wireless signal, and when the a predetermined delay time interval elapsed, the first luminaire 2 transmits a sound signal (sound beacon) via the loudspeaker 6.

The second luminaire 3 receives the sound beacon in step S25. In step S26, the second luminaire 3 stores the receiving time of the sound signal. In particular, the second luminaire 3 stores a current timer value corresponding to the reception time of the sound signal of the timer started in step S24.

When the timer started in step S24 reaches the calculated timer end value, the second luminaire 3 assumes that the measurement of the current test scan using the sound signals are executed.

In step S27, the second luminaire generates the beacon reception result message to the determined recipient defined in the scan activation message. The second luminaire 3 transmits the generated beacon reception result message to the first luminaire 2 in a wireless signal via the transceiver 4 of the second luminaire 3 to the wireless transceiver 4 of the first luminaire 2.

The beacon reception result message may include the number of received sound signals in the current test scan and the stored receiving time of each received sound signal of the current test scan.

In step S31, the first luminaire 2 receives the beacon reception result message via the wireless transceiver 4. The first luminaire 2 generates the beacon reception result message of the test scan based on the received beacon reception result message(s) from the second luminaire(s) 3 in step S32 and transmits the generated beacon reception result message to the commissioning device 14.

The second luminaire 3 as a listening device calculates a time difference between the received (radio packet) wireless signal including the scan activation message and the received sound signal by calculating according to expression (1):

$$t_{sound\ travel\ time} = t_{end\ time} - t_{RF\ delay} - t_{sound\ delay} - t_{start\ time}; \quad (1)$$

wherein $t_{start\ time}$ denotes the time when the wireless signal of the scan activation message was received. In expression (1), $t_{sound\ delay}$ denotes a predetermined delay time interval used by the first luminaire 2 until transmitting the sound beacon signal, the term $t_{RF\ delay}$ denotes the time during which the wireless signal propagates from the first luminaire 2 to the second luminaire 3, and tend time denotes the time when the second luminaire 3 receives the sound beacon signal.

The predetermined delay time interval may be communicated as a parameter in the scan activation message from the first luminaire 2 to the second luminaire 3.

Additionally or alternatively, the predetermined delay time interval may be predetermined and stored in the memory of the second luminaire 3. In a particular example, a value for the predetermined delay time interval may be determined in advance and stored in the luminaires 2, 3. Storing the predetermined value for the predetermined delay time interval in each luminaire 2, 3 may be done at the site of a manufacturer before shipment of a luminaire 2, 3.

The term $t_{RF\ delay}$ in expression (1) is dominated by a time delay caused by the signal processing of the wireless signals in the transceiver 4 of the first device 2 and the transceiver 4 of the second device 3. The term $t_{RF\ delay}$ has typical values of about 3 ms. The term $t_{RF\ delay}$ may be determined before, for example, by using a test wireless signal ("pinging") and stored in each of the luminaires 2, 3.

The measurement may be repeated multiple times. This increases the number of calculated results and increases accuracy of the calculation of the time interval $t_{sound\ travel\ time}$, and therefore increases the accuracy of the estimation of the distance $D_{distance\ estimative}$ according to expression (2):

$$D_{distance\ estimative} = v_{sound} \times t_{sound\ travel\ time}; \quad (2)$$

The parameter $v_{sound}$ denotes the velocity of sound for the current environmental conditions applicable for the lighting system 1.

The environment of the lighting system 1 denotes the space in which the luminaires 2, 3 of the lighting system 1 are arranged, for example a building, a floor of a building, or an exterior area (outdoor area), a forecourt or a parking lot.

The commissioning device 14 may perform the calculation according to expression (2) using the received and evaluated beacon reception result messages.

Figure 5:
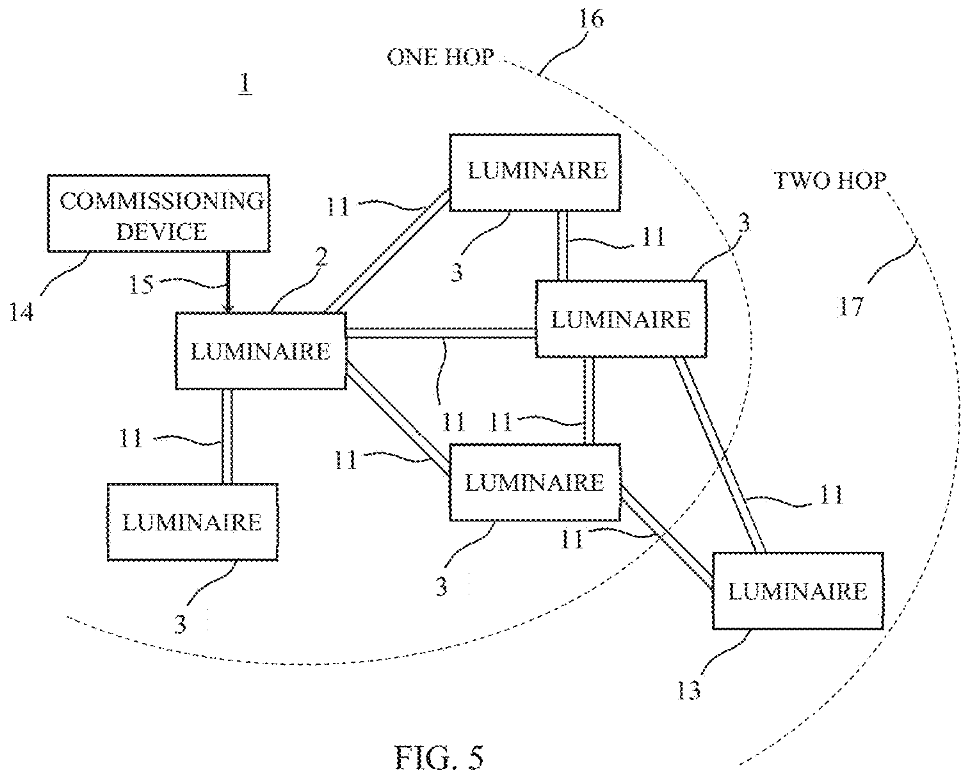
FIG. 5 shows a scenario illustrating an analysis process of acoustic background noise in a lighting system according to an embodiment.

FIG. 5 shows a scenario illustrating an analysis process of acoustic background noise in a lighting system 1 according to an embodiment. The sequence of FIGS. 5 to 8 shows in particular how the process of analysing background noise in in a lighting system one according to an embodiment evolves over time.

The lighting system 1 includes a plurality of luminaires 2, 3, 13, which are connected via the communication network in a mesh topology. Double lines between their individual luminaires 2, 3, 13 indicate an established communication link 11 between the two luminaires 2, 3, 13. FIG. 5 depicts the lighting system 1 from the viewpoint of from one luminaire acting as the first luminaire 2. The second luminaires 3 in FIG. 5 are those of the luminaires 2, 3, 13, which are one hop away from the first luminaire 2 in the mesh communication network. The lower right of FIG. 5, there is depicted one luminaire 13, which in the communication network is two hops away from the first luminaire 2. FIG. 5 indicates the second luminaires 3 within a one-hop communication range 16 from the viewpoint of the first luminaire 2 and the single luminaire 13 which is within a two-hop communication range 17 from the first luminaire 2.

A user may employ the commissioning device 14 to select the first luminaire 2 from the luminaires 2, 3, 13 of the lighting system 1. For example, the user may position the commissioning device 14 in close vicinity of the selected first luminaire 2. The commissioning device 14 transmits a noise analysis request signal 15 to the selected first luminaire 2.

In a particular embodiment, the commissioning device may comprise a wireless transceiver, which communicates directly with the wireless transceiver 4 of the selected first luminaire 2. Alternatively, the commissioning device 14 uses a different combination communication technology, for example, near field communication (NFC) to transmit the noise analysis request signal 15 to the selected first luminaire 2.

The noise analysis request signal 15 includes a noise analysis start message. The noise analysis request signal 15 may further include information, which defines another device, which is the intended recipient of the noise analysis result message 20 to be generated by each second luminaire 3. The information defining the other device may for example, be address information in the wireless communication network connecting the luminaires 2, 3, 13 of the lighting system 1. In one particular example, the address information defines the first luminaire 2 emitting a wireless ranging activation signal 18 that will be discussed with respect to FIG. 6 as the intended recipient. Alternatively, the address information may define the commissioning device 14 transmitting the noise analysis request signal 15 as the intended recipient.

The noise analysis start message included in the noise analysis request signal 15 furthermore includes information on the sound frequencies for which the background noise analysis is to be performed. For example, the noise analysis The noise analysis processing according to the embodiment now continues with the scenario depicted in FIG. 6.

Figure 6:
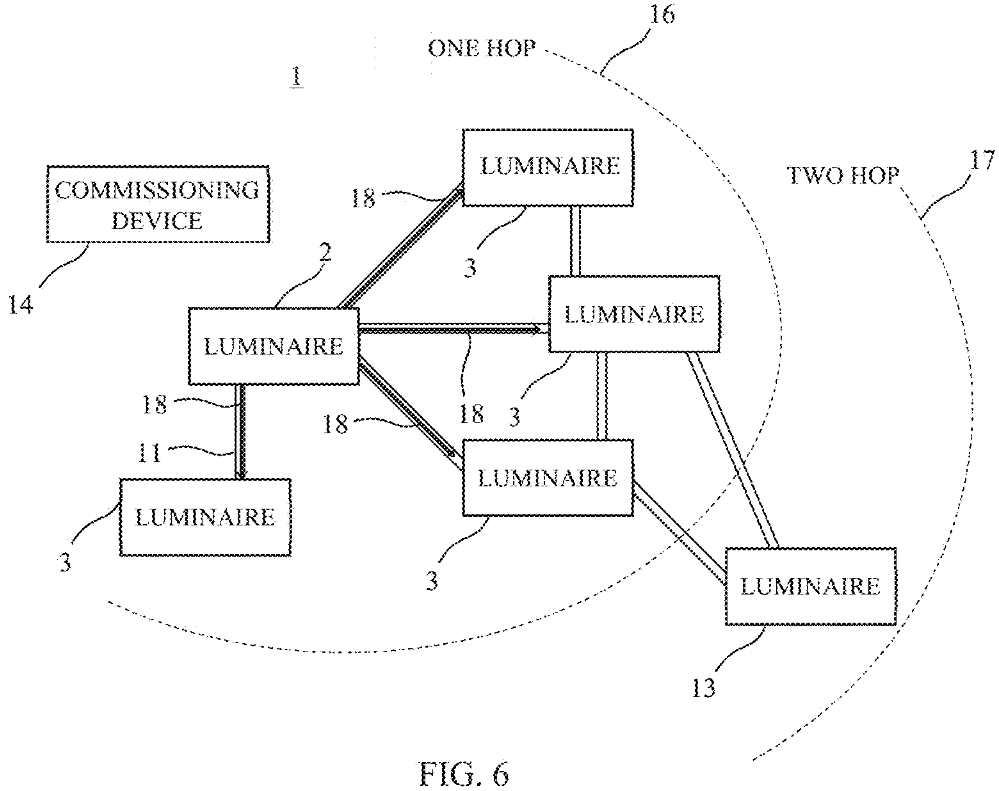
FIG. 6 shows an evolvement of the scenario illustrating an analysis process of acoustic background noise of FIG. 4.

FIG. 6 shows an evolvement of the scenario illustrating an analysis process of acoustic background noise of FIG. 4. In FIG. 6, corresponding the processing of the background noise analysis processing of the embodiment continues with the first luminaire 2 having received the noise analysis request signal 15 including the noise analysis start message transmitted by the commissioning device 14.

In response to receiving the noise analysis request signal 15, the selected first luminaire 2 generates a noise analysis activation signal 18 to each of the second luminaires 3 of the lighting system 1, which are in direct wireless communication with the selected first luminaire 2. This includes in a depicted scenario all luminaires 3 of the lighting system 1, which are within the one hop communication range 16 from the selected first luminaire 2. The selected first luminaire 2 transmits the generated noise analysis activation signal 18 to the second luminaires 3 using they established wireless communication link 11 of the wireless communication network interconnecting the luminaires 2, 3, 13 of the lighting system 1. In particular, the first luminaire 2 transmits the noise analysis activation signal 18 using its wireless transceiver 4 acting as a transmitter and the wireless transceiver 4 of the corresponding second luminaire 3 as a receiver.

On the reception of the wireless ranging activation signal 18 by their respective wireless transceiver 4, the second luminaires 3 each start a timer in response to receiving the noise analysis activation signal 18.

Figure 7:
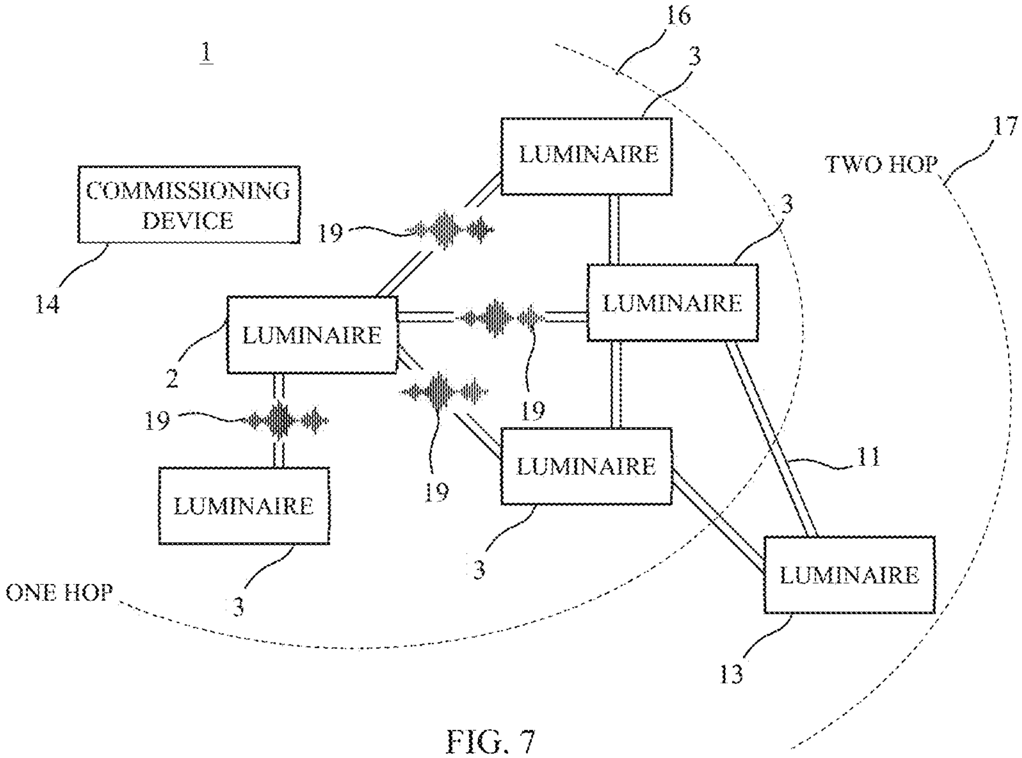
FIG. 7 shows a further evolvement of the scenario illustrating an analysis process of acoustic background noise of FIGS. 4 and 5.

FIG. 7 shows a further evolvement of the scenario illustrating an analysis process of acoustic background noise of FIGS. 4 and 5. FIG. 7 illustrates the processing of the background noise analysis of the embodiment continues with the second luminaires 3 having received the noise analysis activation signal 18 transmitted by the selected first luminaire 2.

In FIG. 7, each of the second luminaires 3, which received the noise analysis activation signal 18, determines a sound background noise level 19 for all of the sound frequencies, for which the background noise analysis is to be performed according to the noise analysis activation signal 18.

Having determined the sound background noise level 19 according to a noise analysis activation signal 18, each of the second luminaires 3 proceed by generating a noise analysis result signal 20. The generated noise analysis result signal 20 includes a quality indicator determined for each of the determined sound background noise levels 19.

Figure 8:
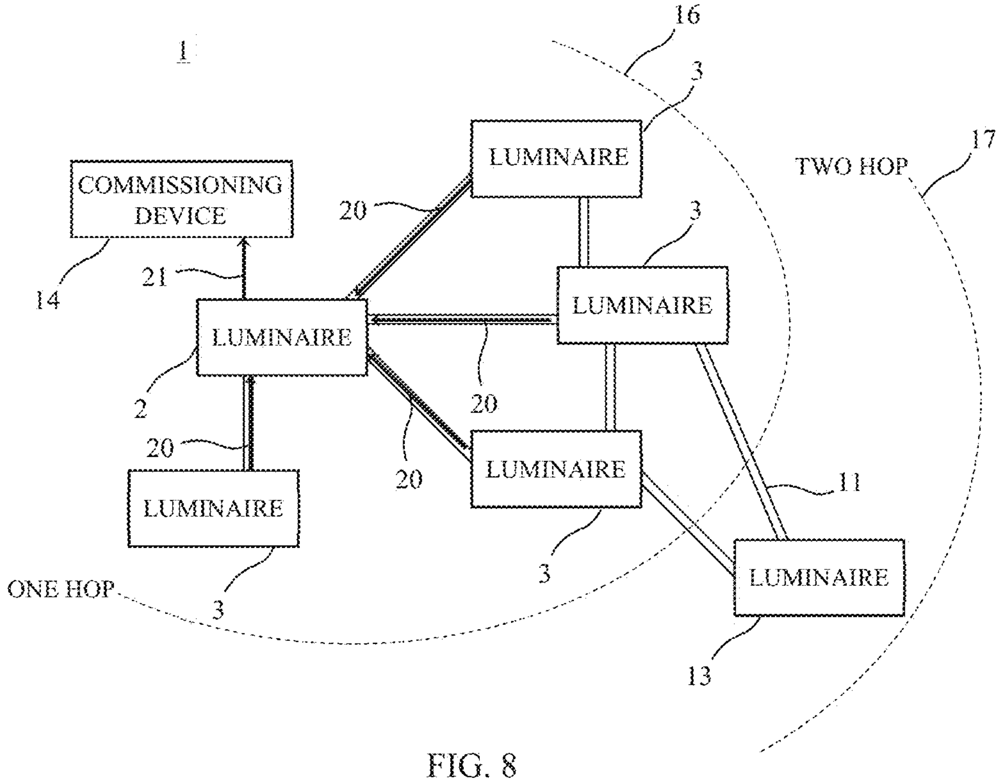
FIG. 8 shows a further evolvement of the scenario illustrating an analysis process of acoustic background noise of FIGS. 4, 5 and 6.

The process of analysing the acoustic background noise proceeds with the scenario shown in FIG. 8 illustrating the analysis process of acoustic background noise of FIGS. 4, 5 and 6 further.

In FIG. 8, each of the second luminaires 3 transmits the generated noise analysis result signal 20 the defined recipient from the noise analysis activation signal 18. In the particular embodiment shown in FIG. 8, the noise analysis activation signal 18 defined in the first luminaire 2 generating and transmitting the noise analysis activation signal 18 as intended recipient for the noise analysis result signal 20. Therefore, the second luminaires 3 transmit the generated noise analysis result signals 20 including information on the determined sound background noise level 19 to the first luminaire 2.

In response to receiving the noise analysis result signals 20 from each of the second luminaires 3 respectively, the first luminaire 2 proceeds by generating a further noise analysis result signal 21 including the combined information on the background noise levels 19 determined by each of the second luminaires 3 respectively for all the sound frequencies for which there background noise analysis was to be performed according to the noise analysis activation signal 18.

The first luminaire 2 may then transmit the generated combined noise analysis result signal 21 to the commissioning device 14.

The commissioning device 14 may then proceed by selecting another of the luminaires 2, 3, 13 of the lighting system one as a new selected luminaire 2 and then proceed by generating and transmitting the corresponding noise analysis request signal 15 to the new selected luminaire 2. The method of performing the background noise level analysis process may proceed until the background noise analysis has been performed for all luminaires 2, 3, 13 of the lighting system 1.

The process of performing background noise level analysis for the lighting system 1 may be repeated at regular intervals, in order to ensure that well as well use for the background noise level 19 are available for the lighting system 1.

Additionally or alternatively, the process for performing background noise level analysis for the lighting system 1 may be initiated by a user using the commissioning device 14 at a specific instance of time.

Figure 9:
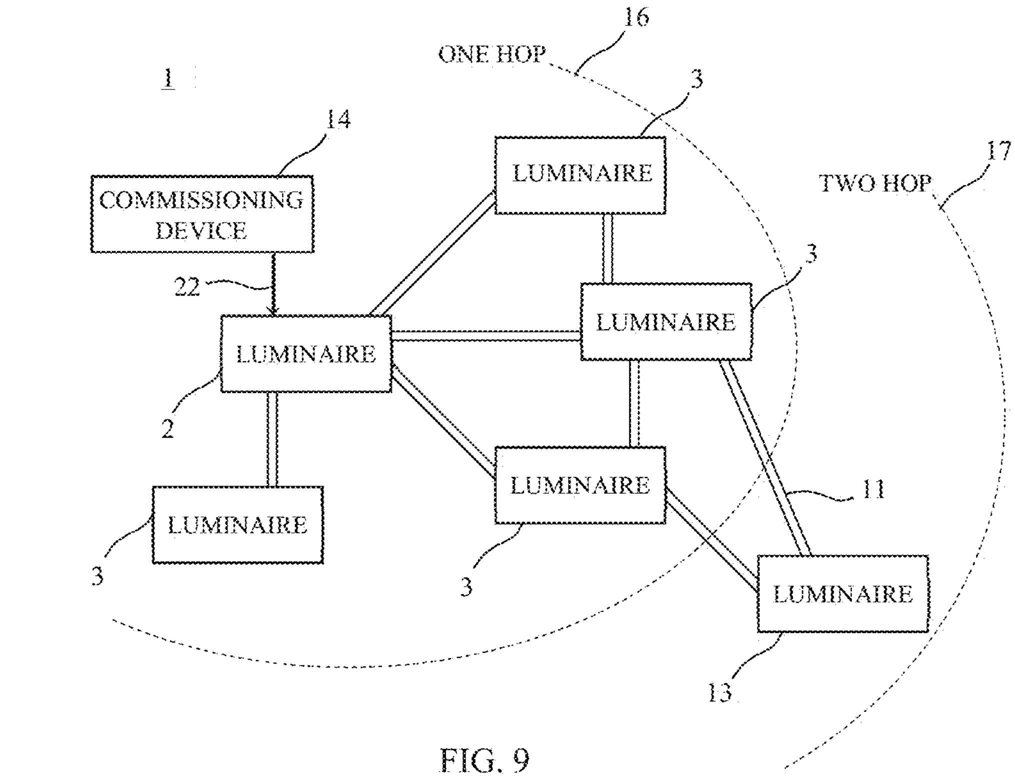
FIG. 9 shows a scenario illustrating a ranging process for determining distances between luminaires of a lighting system according to an embodiment.

FIG. 9 shows a scenario illustrating a ranging process for determining distances between the luminaires 2, 3, 13 of the lighting system 1 according to an embodiment.

In particular, the result of the ranging process includes the determined distances between the luminaires 2, 3, 13 of the lighting system 1, and enables to determine locations of luminaires 2, 3, 13 of a lighting system 1 during a commissioning process, using the determined distances between the luminaires 2, 3, 13, and a predetermined location of at least one of the luminaires 2, 3, 13.

The predetermined location may be the location of a selected first luminaire 2, which the commissioning device 14 determines using a positioning system integrated with the commissioning device 14. The positioning system may be a known indoor positioning system.

Figure 13:
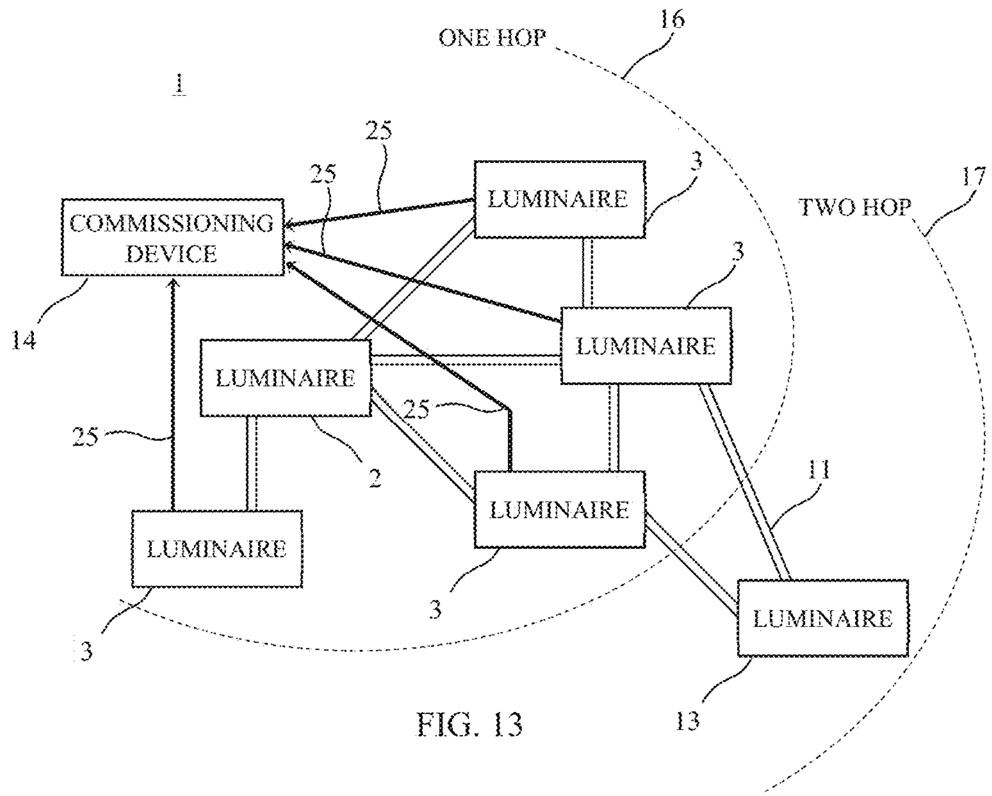
FIG. 13 shows an alternate evolvement of the scenario illustrating the ranging process of FIGS. 8, 9 and 10.
Figure 14:
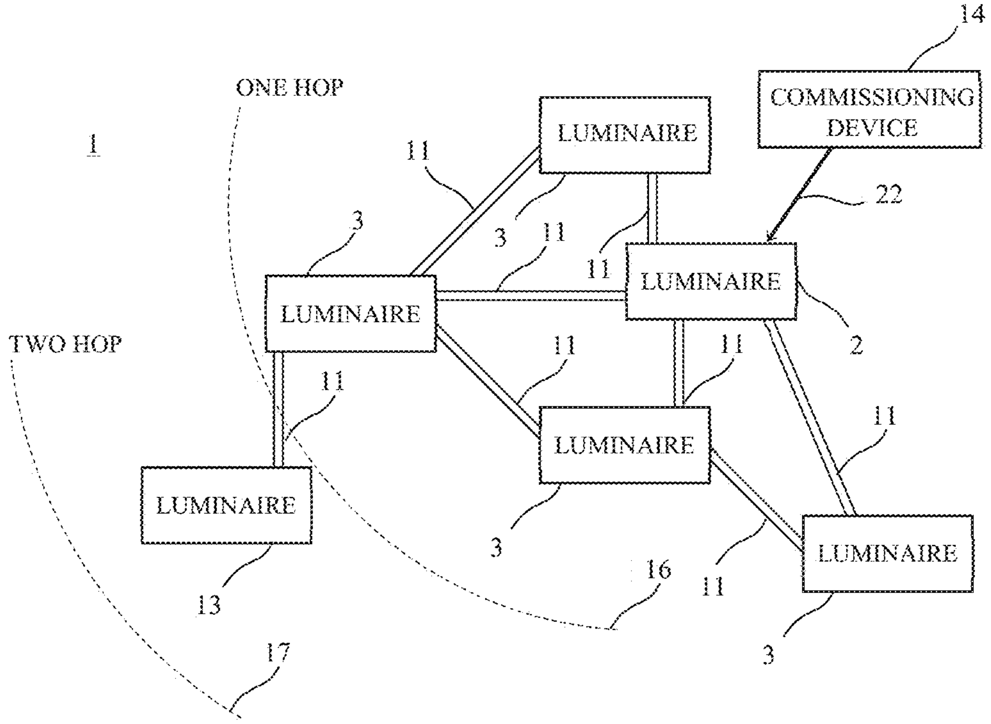
FIG. 14 shows a further evolvement of the scenario illustrating the ranging process for determining distances between the luminaires of the lighting system of FIGS. 8 to 12 after selecting another luminaire as first luminaire.
Figure 15:
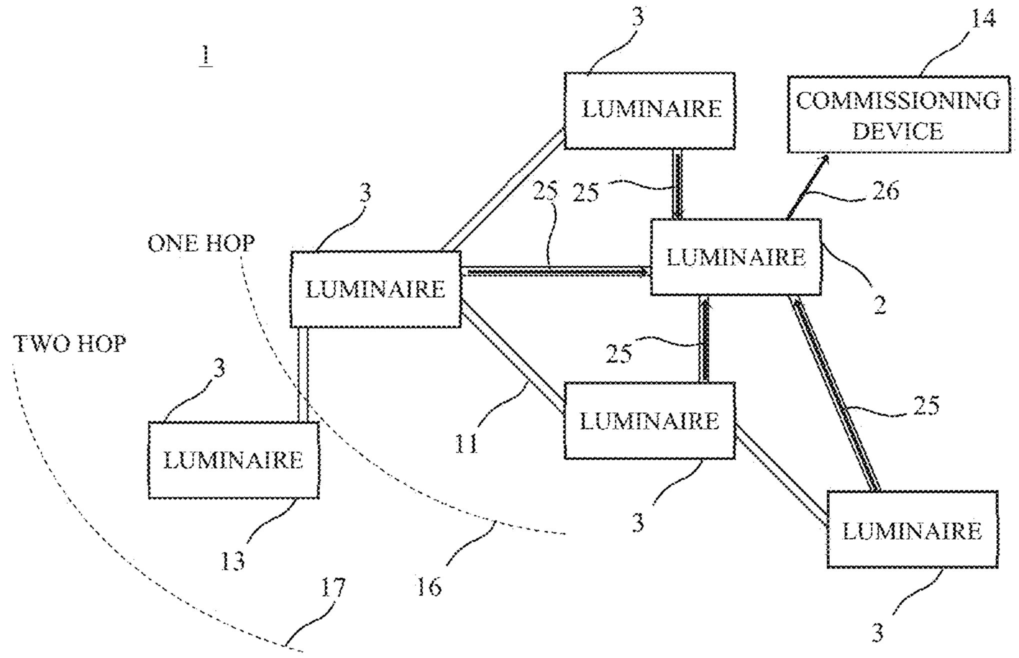
FIG. 15 shows a further evolvement of the scenario illustrating the ranging process of FIG. 13.

In FIG. 9, and in FIGS. 10 to 15 depicting the further evolvement of the scenario shown in FIG. 15, the general aspects of the structure of the lighting system 1 and its particular structure as already discussed with respect to FIG. 5 apply in in an entirely corresponding manner. Each of the luminaires 2, 3, 13 of the lighting system 1 communicates with at least one other of the luminaires 2, 3, 13 of the lighting system.

The process of determining distances between the luminaires 2, 3, 13 of the lighting system 1 according to FIGS. 9 to 15 requires that are background noise analysis for sound frequencies has been performed before. In particular, the background noise analysis for sound frequencies may have been performed as discussed according to the embodiment discussed with reference to FIGS. 5 to 8 above.

In FIG. 9, the process of determining distances starts with the commissioning device 14 selecting a particular luminaire 2, 3, 13 as the first luminaire 2 from the luminaires 2, 3, 13 of the lighting system 1.

The commissioning device generates and transmits a first wireless signal 22 to the selected first luminaire 2. The first wireless signal 22 includes the sound beaconing start message.

The selected first luminaire 2 generates, in response to receiving the first wireless signal 22, a wireless ranging activation signal 23 for the second luminaires 3 of the lighting system 1. The second luminaires 3 are those luminaires 2, 3, 13 of the lighting system 1 that are in direct wireless communication with the selected first luminaire 2. In particular, the second luminaires 3 are those luminaires 2, 3, 13 of the lighting system 1 that are within the one-hop communication range 16 of the first luminaire 2.

The wireless ranging activation signal 23 further includes information on a device, which is an intended recipient for the second wireless signal 25 to be discussed with reference to FIG. 12 below. The information may include an address of the first luminaire 2 in the wireless communication network of the lighting system 1. Alternatively, the information includes an address of the commissioning device 14 in the wireless communication network of the lighting system 1.

Figure 10:
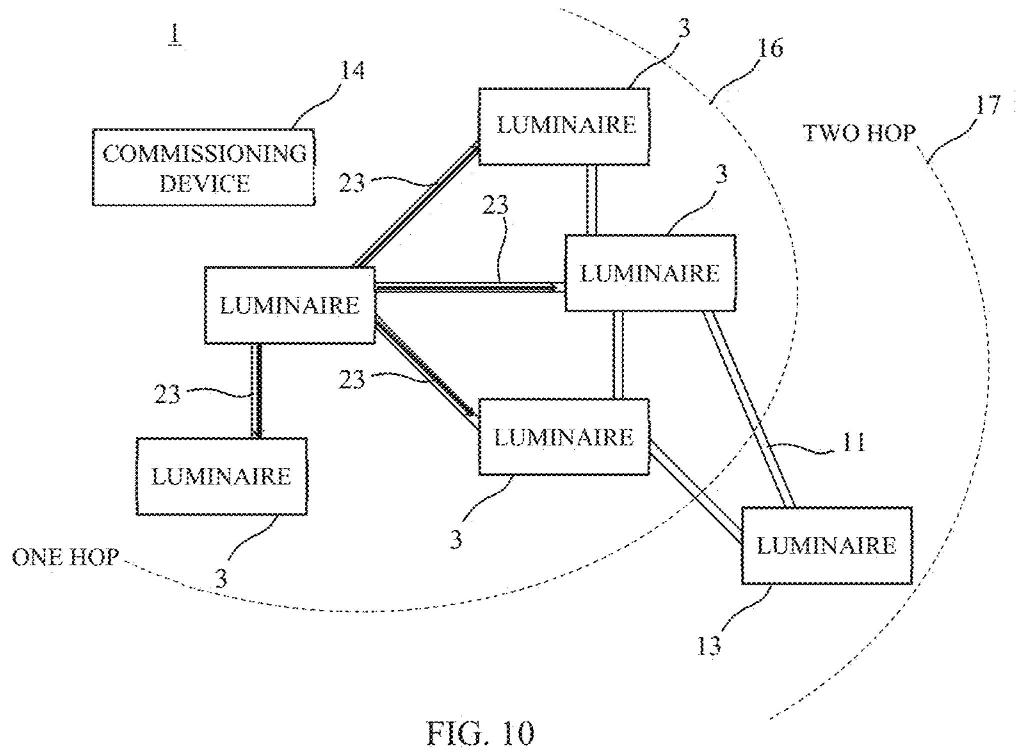
FIG. 10 shows an evolvement of the scenario illustrating the ranging process for determining distances between luminaires of FIG. 8.

The method then proceeds with the scenario shown in FIG. 10.

FIG. 10 shows the evolvement of the scenario illustrating the ranging process for determining distances between luminaires of FIG. 8. In particular, in FIG. 10 the selected first luminaire 2 transmits in response to receiving the first wireless signal 15, the generated wireless ranging activation signal 23 to the second luminaires 3 of the lighting system 1.

The second luminaires 3 each start a timer in response to receiving the wireless ranging activation signal 23 from the selected first luminaire 2.

Figure 11:
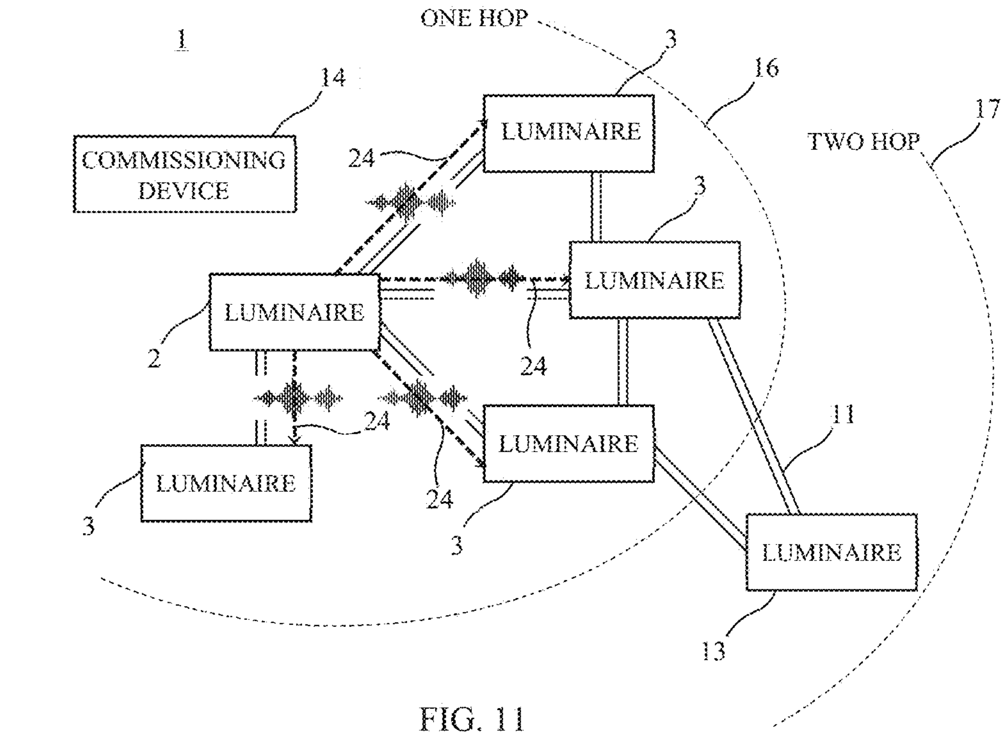
FIG. 11 shows a further evolvement of the scenario illustrating the ranging process of FIGS. 8 and 9.

After a predetermined delay time interval elapsed since the first luminaire 2 transmitted the wireless ranging activation signal 23, the method then proceeds with the scenario shown in FIG. 11.

FIG. 11 shows a further evolvement of the scenario illustrating the ranging process of FIGS. 9 and 10.

The first luminaire 2 transmits, a sound signal 24 based on a result of the performed background noise analysis after a predetermined delay time interval since transmitting the wireless ranging activation signal 23 elapsed. The first luminaire 2 transmits the sound signal 24 via its loudspeaker 6. Each of the second luminaires 3 receives the sound signal 24 we wired at least one microphone 7.1, 7.2.

Each of the second luminaires 3, calculates a time interval based on a first time of starting the timer and a second time of receiving the sound signal 24.

Each of the second luminaires 3, generates a second wireless signal 25 including the calculated time interval for transmission to the device defined in the wireless ranging activation signal 23 received by the second luminaire 3 from the first luminaire 2.

Figure 12:
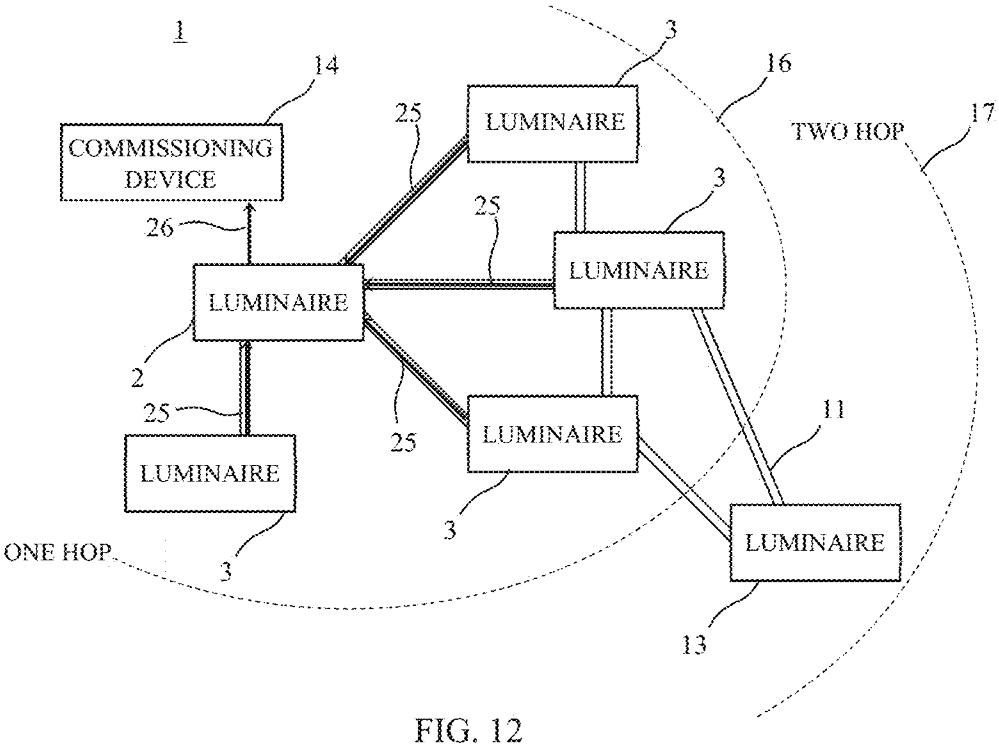
FIG. 12 shows a further evolvement of the scenario illustrating the ranging process of FIGS. 8, 9 and 10.

The method then proceeds with the scenario shown in FIG. 12. Alternatively, the method proceeds with the scenario shown in FIG. 13.

FIG. 12 shows a further evolvement of the scenario illustrating the ranging process of FIGS. 9, 10 and 11. In the embodiment of FIG. 12, the device defined in the wireless ranging activation signal 23 is the first luminaire 2.

In the scenario shown in FIG. 12, each of the second luminaire 3 transmits the generated second wireless signal 25 to the first luminaire 2 defined in the wireless ranging activation signal 23 via the wireless transceiver 4 of the second luminaires 3 to the wireless transceiver 4 of the first luminaire 2.

In response to receiving the second wireless signal 25 from the second luminaires 3, the first luminaire 2 generates a third wireless signal 26 including the information received in the second wireless signals 25 from the second luminaires 3. The second luminaire 2 transmits the generated third wireless signal 26 to the commissioning device 14.

The commissioning device 14 proceeds by determining locations of the luminaires 2, 3, 13 of the lighting system 1 based on the calculated time intervals received in the third wireless signal 26.

FIG. 13 shows an alternate evolvement of the scenario illustrating the ranging process of FIGS. 9, 10, 11 and 12. In the embodiment of FIG. 12, the device defined in the wireless ranging activation signal 23 is the commissioning device 14.

In the scenario shown in FIG. 13, each of the second luminaire 3 transmits the generated second wireless signal 25 to the commissioning device 14 defined in the wireless ranging activation signal 23.

In a particular embodiment, the third luminaires 3 may transmit the second wireless signal 25 via the wireless transceiver 4 of the second luminaires 3 to the wireless transceiver 4 of the commissioning device 14.

Alternatively, the third luminaires 3 may transmit the second wireless signal 25 using a different communication means to the wireless communication network of the lighting system 1 to the commissioning device 14.

The commissioning device 14 proceeds by determining locations of the luminaires 2, 3, 13 of the lighting system 1 based on the calculated time intervals received in the second wireless signals 27.

FIG. 14 shows a further evolvement of the scenario illustrating the ranging process for determining distances between the luminaires 2, 3, 13 of the lighting system 1 of FIGS. 9 to 13.

The evolvement of the scenario depicted in FIG. 14 bases on the same lighting system 1 comprising luminaires 2, 3, 13 connected by a communication network as discussed with reference to FIG. 5 in detail. After performing the steps of the ranging method using the left luminaire in the left centre of the arrangement of luminaires 2, 3, 13 of the lighting system 1, the method proceeds by selecting a different luminaire of the luminaires 2, 3, 13 of the lighting system 1 as a new first luminaire 2. The selected new first luminaire 2 is the luminaire in the right centre of the lighting system 1.

Selecting the newly luminaire 2 results in in rearranging the one-hop communication range 16 with respect to the spatial arrangement of the luminaires 2, 3, 13 of the lighting system 1. FIG. 14 denotes the second luminaires 3 within the one hop communication range 16 from the first luminaire 2. The luminaires 13 in the lower left of the spatial arrangement of luminaires 2, 3, 13 of the lighting system one is to hops away from the first luminaire 2 and therefore within the two-hop communication range 17. FIG. 14, in particular, illustrates the commissioning device 14 transmitting the first wireless signal 22 to the new selected first luminaire 2. The first wireless signal 22 includes the sound beaconing start message.

The new selected first luminaire 2 then proceeds by transmitting, in response to receiving the first wireless signal 22, the wireless ranging activation signal 23 to the second luminaires 3 of the lighting system 1. The second luminaires 3 of the lighting system 1 depicted in FIG. 14 start a timer in response to receiving the wireless ranging activation signal 23. The new selected first luminaire 2 proceeds by transmitting the sound signal 24 to the second luminaires 3 based on a result of the previously performed background noise analysis after a predetermined delay time interval since transmitting the wireless ranging activation signal 23 elapsed. Each of the second luminaires 3 receives the sound signal 24 transmitted by the new selected first luminaire 2. Each of the second luminaires 3 calculates a time interval based on a first time of starting the timer and a second time of receiving the sound signal 24 at the respective second luminaire 3.

The method then proceeds with the scenario shown in FIG. 15.

FIG. 15 shows a further evolvement of the scenario illustrating the ranging process of FIG. 14.

In FIG. 15, each of the second luminaires 3 generates the second wireless signal 25 including the calculated time interval and transmits the generated second wireless signal 25 to a device defined in the wireless ranging activation signal 23. The device defined in the wireless ranging activation signal 23 of the scenario on which FIG. 15 bases is the commissioning device 14.

In the scenario shown in FIG. 15, each of the second luminaires 3 transmits the generated second wireless signal 25 to the first luminaire 2 defined in the wireless ranging activation signal 23 via the wireless transceiver 4 of the second luminaires 3 to the wireless transceiver 4 of the first luminaire 2.

In response to receiving the second wireless signal 25 from the second luminaires 3, the first luminaire 2 generates a third wireless signal 26 including the information received in the second wireless signals 25 from the second luminaires 3. The second luminaire 2 transmits the generated third wireless signal 26 to the commissioning device 14.

The commissioning device 14 proceeds by determining locations of the luminaires 2, 3, 13 of the lighting system 1 based on the calculated time intervals received in the third wireless signal 26.

Figure 16:
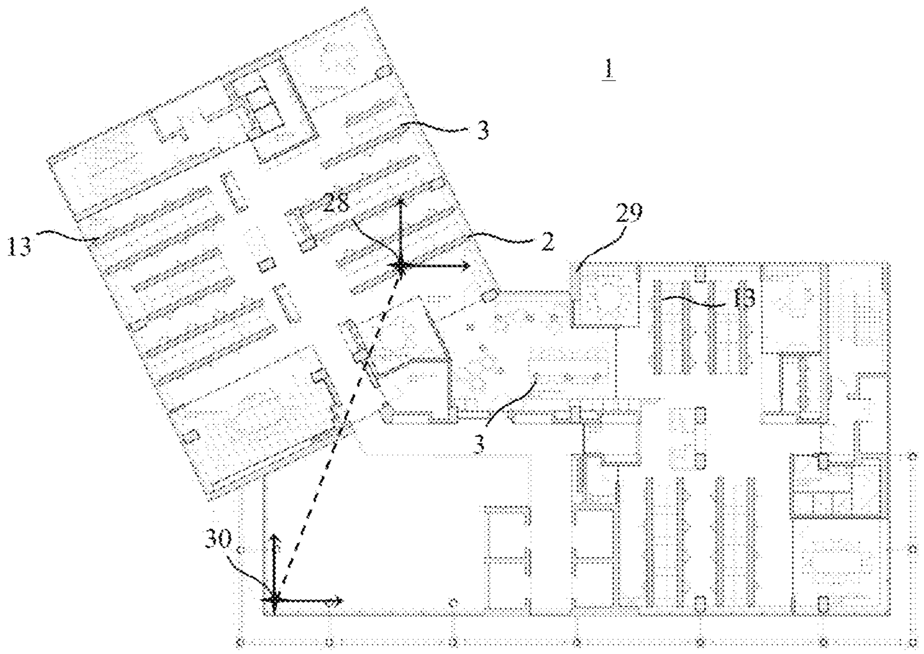
FIG. 16 illustrates mapping of a determined spatial arrangement luminaires of the lighting system to building floor plan.

FIG. 16 illustrates mapping of a determined spatial arrangement of luminaires 2, 3, 13 of the lighting system 1 to a building floor plan 29.

The building floor plan 29 includes a layout of a floor of building including exterior walls of the building and interior walls. The depicted building floor plan 29 also details parts of the furniture, such as desks at individual working places or in meeting rooms.

FIG. 16 also shows the spatial arrangement of luminaires 2, 3, 13, determined by applying the method for determining locations of luminaires 2, 3, 13 of a lighting system 1 during a commissioning process. In particular, the method is performed repeatedly in plural iterations, wherein in each iteration or repetition, another luminaire of the luminaires 2, 3, 19 is selected as the first luminaire 2, and subsequently, the respective distances of the second luminaires to the selected first luminaire 2 are determined.

The method to determine locations of the luminaires 2, 3, 13 of the lighting system 1 during the commissioning process may terminate, in case for all luminaires 2, 3, 13 of the lighting system 1 at least two distances to other luminaires 2, 3, 13 have been determined.

Alternatively, termination criterion for repeating the method while changing the first luminaire 2 for each iteration may be that an accuracy of all the determined distances does not change from iteration to iteration significantly.

The method may then proceed by determining the spatial arrangement of the luminaires 2, 3, 13 on the floor of the building based on the determined distances.

The method may proceed by determining a reference location 18 for at least one of the luminaires 2, 3, 13, for example, using a positioning system integrated in the commissioning device 14.

If the reference location 28 of one of the luminaires 2, 3, 13 is known with respect to a reference point 30 of the building floor plan 29, the method may then map the determined spatial arrangement of luminaires 2, 3, 13 to the building floor plan 29. Thus, the method enables to determine the actual locations of the luminaires 2, 3, 13 with respect to the building floor plan 29.

A lighting planner may use the method, for example, for comparing the actual locations of the installed luminaires 2, 3, 13 in contrast to intended locations of the luminaires 2, 3, 13 according to his lighting installation plans.

A commissioning process may use the actual spatial arrangement of the luminaires 2, 3, 13 in order to set at least on lighting parameter based on the actual spatial arrangement of the lighting system 1, without having to use the commissioning device for determining the actual position for each luminaire 2, 3, 13.

The lighting system 1 may provide each or at least some of the luminaires 2, 3, 13 with its respective determined location. A mobile object, for example a mobile phone, a tablet or a notebook with a wireless communication capability and within communication range of a luminaire 2, 3, 13 may request a ranging information from a luminaire 2, 3, 13. The luminaire 2, 3, 13 may respond to the request by transmitting a wireless signal including the determined location of the luminaire 2, 3, 13 stored in its memory, and a sound signal. The mobile object may proceed by determining its own location based on the received wireless signal including the determined location for the luminaire 2, 3, 13 and the received sound signal.

Calculating the position of the mobile object may include determining the distance of the mobile object to the luminaire 2, 3, 13 with its known location, or determining distances to plural luminaires 2, 3, 13 for calculating the location of the mobile object with an increased accuracy.

The luminaire 2, 3, 13 may calculate a location of at least one mobile object.

The invention claimed is:

1. A method for determining locations of luminaires (2, 3, 13) of a lighting system (1), wherein each of the luminaires (2, 3, 13) is configured to communicate with at least one other of the luminaires (2, 3, 13), and the method comprises:

performing a background noise analysis for sound frequencies;

selecting a first luminaire (2) from the luminaires (2, 3, 13) of the lighting system (1);

providing a first signal (22) to the selected first luminaire (2);

transmitting (S21), by the selected first luminaire (2) in response to receiving the first signal (22), a wireless ranging activation signal (23) to second luminaires (3) of the lighting system (1), wherein the second luminaires (3) are luminaires (2, 3, 13) of the lighting system (1) that are in direct wireless communication with the first luminaire (2);

starting (S26), by each of the second luminaires (3), a timer in response to receiving (S22) the wireless ranging activation signal (23);

transmitting (S27), by the first luminaire (2), a sound signal (24) based on a result of the performed background noise analysis after a predetermined delay time interval since transmitting (S21) the wireless ranging activation signal (23) elapsed;

receiving (S28), by each of the second luminaires (3), the sound signal (24);

calculating (S29), by each of the second luminaires (3), a time interval based on a first time of starting the timer and a second time of receiving the sound signal (24);

generating (S30), by each of the second luminaires (3), a second signal (25) including the calculated time interval and transmitting (S30) the second wireless signal (25) to a device defined in the wireless ranging activation signal (23);

determining locations of the luminaires (2, 3, 13) of the lighting system (1) based on the calculated time intervals received in the second signals (25).

2. The method according to claim 1, wherein the step of performing the background noise analysis comprises:

providing a noise analysis request signal (15) to the selected first luminaire (2) of the lighting system (1), wherein the noise analysis request signal (15) includes information on the sound frequencies for performing the background noise analysis;

transmitting, by the selected first luminaire (2) in response to receiving the noise analysis request signal (15), a noise analysis activation signal (18) to the second luminaires (3);

determining, by each of the second luminaires (3), a sound background noise level (19) for each of the sound frequencies for which the background noise analysis is to be performed;

transmitting, by each of the second luminaires (3) a noise analysis result signal (20) to the first luminaire (2) or to another device that is defined in the noise analysis activation signal (18), wherein the noise analysis result signal (20) includes a quality indicator determined for each of the determined sound background noise levels (19).

3. The method according to claim 2, wherein the method comprises, in the step of performing the background noise analysis, determining the background noise level (19) for sound frequencies of a predetermined frequency range of the sound frequencies.

4. The method according to claim 1, wherein calculating the time interval by each of the second luminaires (3) comprises:

calculating the time interval based on the sound signal propagation delay, the predetermined delay time interval, and a wireless processing delay time interval, wherein the wireless processing delay time interval corresponds to a time for processing of the wireless ranging activation signal in a wireless transceiver (4) of each of the first and the second luminaires (2, 3);

the method further comprises a step of automatically determining the wireless processing delay time interval based on transmitting a wireless delay time measurement signal between the luminaires (2, 3).

5. The method according to claim 1, wherein the method comprises repeating the steps of transmitting the sound signal (24), receiving the sound signal (24), calculating the time interval using sound signals (24) of on plurality of different sound frequencies, generating and transmitting the second wireless signal (25) including the calculated time intervals for the sound signals on the plurality of different sound frequencies.

6. The method according to claim 1, wherein the device defined in the wireless ranging activation signal (23) is the first luminaire (2), or a commissioning device (14), wherein the wireless ranging activation signal (23) includes a network address of the commissioning device (14).

7. The method according to claim 1, wherein the method comprises repeating the step of selecting the first luminaire (2) with selecting a different luminaire (2, 3, 13) of the lighting system (1) as a new first luminaire (2), and repeating the steps of transmitting the sound signal (24), receiving the sound signal (24), calculating the time interval, generating and transmitting the second wireless signal (25) including the calculated time interval for the selected new first luminaire (2) as the first luminaire (2).

8. The method according to claim 1, wherein the method comprises repeating the steps of selecting the first luminaire (2) with selecting a different luminaire (2, 3, 13) of the lighting system (1) as the new first luminaire (2), and repeating the steps of transmitting the sound signal (24), receiving the sound signal (4), calculating the time interval, generating and transmitting the second wireless signal (25) including the calculated time interval for the selected new first luminaire (2), until every luminaire (2, 3, 13) of the lighting system (1) has been selected as the first luminaire ( ) at least once.

9. The method according to claim 1, wherein the luminaires (2, 3, 13) each include a microphone array including at least two microphones (7.1,7.2), and the method further includes determining, for each of the second luminaires (3), a relative direction of the first luminaire (2) with respect to the second luminaire (3).

10. The method according to claim 1, wherein each luminaire (2, 3, 13) includes plural microphones (7.1, 7.2), and in the step of calculating, each of the second luminaires (3) calculates plural time intervals based on the first time of starting the timer and the second time of receiving the sound signal for each of the plural microphones (7.1, 7.2), the second signal (23) includes the plural time intervals calculated for each of the plural microphones (7.1, 7.2), the second wireless signal (25) is transmitted to the commissioning device (14), and in the step of determining locations of the luminaires (2, 3, 13) of the lighting system (1), determining the locations based on the calculated time intervals for each of the plural microphones (7.1, 7.2).

11. The method according to claim 1, wherein the sound frequencies are in a range of audio frequencies between 2 kHz to 7 kHz.

12. The method according to claim 1, wherein the device defined in the wireless ranging activation signal (23) is an edge gateway device of the lighting system (1), or a cloud server.

13. The method according to claim 1, wherein the method further comprises detecting presence of at least one moving object in the environment of the lighting system (1) based on a reflected sound signal.

14. The method according to claim 1, wherein the method further comprises calculating a location of at least one mobile object, by the at least one mobile object, based on a received wireless positioning signal, wherein the received wireless positioning signal includes location information of at least one of the luminaires (2, 3, 13), and further based on a received sound signal transmitted by the at least one of the luminaires (2, 3, 13).

15. The method according to claim 1, wherein the method further comprises using a microphone (7.1, 7.2) of at least one of the luminaires (2, 3, 13) as an input device and a loudspeaker (6) of the at least one of the luminaires (2, 3, 13) as an output device of a voice user interface.

16. The method according to claim 1, wherein the method further comprises generating a map of a spatial arrangement of the luminaires (2, 3, 13) of the lighting system (1) based on the determined locations of the luminaires (2, 3, 13) and an acquired reference location (28) of at least one of the luminaires (2, 3, 13).

17. A non-transitory computer-readable storage medium storing computer program instructions which, when executed, perform a method according to claim 1.

18. A system for determining locations of luminaires (2, 3, 13) of a lighting system (1), wherein each of the luminaires (2, 3, 13) is configured to communicate with at least one other of the luminaires (2, 3, 13), and the system comprises:

a device (14) configured to initiate performing a background noise analysis for sound frequencies, to select a first luminaire (2) from the luminaires (2, 3, 13) of the lighting system (1), and to transmit a first signal (22) to the selected first luminaire (2);

the selected first luminaire (2) is configured to transmit in response to receiving the first signal (22), a wireless ranging activation signal (23) to second luminaires (3) of the lighting system, wherein the second luminaires (3) are luminaires (2, 3, 13) of the lighting system that are in direct wireless communication with the first luminaire (2), the selected first luminaire (2) is further configured to transmit a sound signal (24) based on a result of the performed background noise analysis after a predetermined delay time interval since transmitting the wireless ranging activation signal (23) elapsed;

each of the second luminaires (3) is configured to start a timer in response to receiving the wireless ranging activation signal (23), to receive the sound signal (24), to calculate a time interval based on a first time of starting the timer and a second time of receiving the sound signal (24);

each of the second luminaires (3) is further configured to generate a second signal (25) including the calculated time interval and to transmit the second signal (25) to a device defined in the received wireless ranging activation signal (23); and the device is configured to determine locations of the luminaires (2, 3, 13) of the lighting system based on the calculated time intervals received in the second wireless signals (25), and to generate a map of a spatial arrangement of the luminaires (2, 3, 13) of the lighting system based on the determined locations of the luminaires (2, 3, 13) and an acquired reference location (28) of at least one of the luminaires (2, 3, 13).

19. A system for determining locations of luminaires (2, 3, 13) of a lighting system (1) according to claim 18, wherein the first luminaire is configured to communicate with at least one other of the luminaires (2, 3, 13) of the lighting system (1), and the first luminaire comprises a wireless transceiver (4) configured to transmit and to receive wireless signals (11, 22, 25) with the at least one other of the luminaires (2, 3, 13) and a commissioning device (14), a sound emitter (6) configured to transmit sound (12, 24), at least one microphone (7.1, 7.2) configured to receive sound (12, 24), and a control circuit (5), and in a first mode:

the wireless transceiver (4) is configured receive from the device (14), a first signal (22), and to generate and transmit in response to receiving the first signal (22), a wireless ranging activation signal (23) to the at least one other of the luminaires (3) of the lighting system (1) that is in direct wireless communication with the luminaire;

the sound emitter (6) is configured to transmit a sound signal (24) after a predetermined delay time interval since transmitting the wireless ranging activation signal (23) elapsed;

the wireless transceiver (4) is configured receive from the at least one other of the luminaires (3), a second signal (25) including a calculated time interval and to transmit the received second wireless signal (25) to the device (14); and in a second mode:

the control circuit (4) is configured to start a timer in response to receiving the wireless ranging activation signal (23) from the at least one other of the luminaires (2), the at least one microphone (7.1, 7.2) is configured to receive the sound signal (24) from the at least one other of the luminaires (2) of the lighting system (1), the control circuit (4) is further configured to calculate a time interval based on a first time of starting the timer and a second time of receiving the sound signal (24);

the control circuit (4) is further configured to generate a second signal (24) including the calculated time interval and to control the wireless transceiver (4) to transmit the generated second signal (25) to a device defined in the received wireless ranging activation signal (23).

* * * * *